United States Patent
Watanabe

(10) Patent No.: US 8,036,593 B2
(45) Date of Patent: Oct. 11, 2011

(54) INTERCOM SYSTEM WITH IMAGING FUNCTION AS WELL AS AUDIO TERMINAL, VIDEO TERMINAL, HOME GATEWAY DEVICE AND INTERCOM ADAPTER CONSTITUTING THE SYSTEM

(75) Inventor: Kenichi Watanabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 930 days.

(21) Appl. No.: 11/993,447

(22) PCT Filed: Jun. 20, 2006

(86) PCT No.: PCT/JP2006/312304
§ 371 (c)(1),
(2), (4) Date: Dec. 20, 2007

(87) PCT Pub. No.: WO2006/137388
PCT Pub. Date: Dec. 28, 2006

(65) Prior Publication Data
US 2010/0197218 A1    Aug. 5, 2010

(30) Foreign Application Priority Data
Jun. 24, 2005  (JP) .................................. 2005-184893

(51) Int. Cl.
*H04H 20/71* (2008.01)
(52) U.S. Cl. .......................... 455/3.05; 370/401; 370/352
(58) Field of Classification Search ................. 455/3.05; 370/401, 356, 338; 726/12; 348/14.01, 14.02, 348/153
See application file for complete search history.

(56) References Cited

U.S. PATENT DOCUMENTS

| | | | |
|---|---|---|---|
| 7,636,103 B2 * | 12/2009 | Fukuda et al. | 348/14.01 |
| 2005/0122963 A1 * | 6/2005 | Jeon et al. | 370/352 |
| 2005/0141529 A1 * | 6/2005 | Miyajima et al. | 370/401 |
| 2005/0232252 A1 * | 10/2005 | Hoover | 370/356 |

FOREIGN PATENT DOCUMENTS

| | | | |
|---|---|---|---|
| JP | 2000-092235 A | 3/2000 |
| JP | 2003-023441 A | 1/2003 |
| JP | 2003-78629 A | 3/2003 |
| JP | 2003-283677 A | 10/2003 |
| JP | 2004-120309 A | 4/2004 |
| JP | 2004-165949 A | 6/2004 |
| JP | 2004-289657 A | 10/2004 |

* cited by examiner

*Primary Examiner* — Nguyen Vo
*Assistant Examiner* — Golam Sorowar
(74) *Attorney, Agent, or Firm* — Birch, Stewart, Kolasch & Birch, LLP

(57) ABSTRACT

When an intercom slave issues a call signal, all video terminals registered as terminals display images provided from the intercom slave. When an audio terminal responds to a call signal, control is performed to allow speech communications between the intercom slave and the audio terminal having responded to the call signal, to stop displaying of the images of the intercom slave by each video terminal and to cause the video terminal selected by the audio terminal to display the images. A combination of the selected video terminal and the audio terminal is registered. The audio terminals are displayed in a list form for selection. The video terminal receiving a radio wave with the highest intensity from the audio terminal is selected.

8 Claims, 10 Drawing Sheets

FIG.6A

LOCAL TERMINAL MANAGEMENT TABLE

| MANAGEMENT NUMBER | DEVICE NAME | TYPE | AUDIO COMMUNICATIONS | VIDEO & AUDIO COMMUNICATIONS | ONLY VIDEO RECEPTION |
|---|---|---|---|---|---|
| 1 | AUDIO TERMINAL B | CORDLESS TELEPHONE MASTER | CAPABLE | INCAPABLE | INCAPABLE |
| 2 | GENERAL-PURPOSE DEVICE C | VIDEO OUTPUT DEVICE | INCAPABLE | INCAPABLE | CAPABLE |
| 3 | GENERAL-PURPOSE DEVICE D | PERSONAL COMPUTER | CAPABLE | CAPABLE | CAPABLE |
| 4 | VIDEO TERMINAL E | VIDEO TELEPHONE | CAPABLE | CAPABLE | CAPABLE |
| 5 | VIDEO TERMINAL F | VIDEO TELEPHONE | CAPABLE | CAPABLE | CAPABLE |
| 6 | AUDIO TERMINAL G | CELLULAR PHONE | CAPABLE | INCAPABLE | INCAPABLE |

FIG.6B

TERMINAL COMBINATION REGISTRATION TABLE

| COMBINATION NUMBER | AUDIO TERMINAL | VIDEO TERMINAL |
|---|---|---|
| 1 | AUDIO TERMINAL G | VIDEO TERMINAL E |
| 2 | AUDIO TERMINAL B | GENERAL-PURPOSE DEVICE C |
| 3 | VIDEO TERMINAL E | VIDEO TERMINAL E |
| 4 | VIDEO TERMINAL F | VIDEO TERMINAL F |
| 5 | GENERAL-PURPOSE DEVICE D | GENERAL-PURPOSE DEVICE D |

INTERCOM SYSTEM WITH IMAGING FUNCTION AS WELL AS AUDIO TERMINAL, VIDEO TERMINAL, HOME GATEWAY DEVICE AND INTERCOM ADAPTER CONSTITUTING THE SYSTEM

TECHNICAL FIELD

The invention relates to an intercom system that has an imaging function and allows a user to perform speech communications with a visitor through audio terminals while viewing an image of the visitor taken by an intercom slave and displayed on a video terminal, and also relates to component devices thereof

BACKGROUND ART

A conventional intercom apparatus with a camera includes an intercom slave that maybe simply referred to as a "slave" hereinafter and is formed of a call switch used by a visitor for calling a resident, a set of a microphone and a speaker used for speech communications between the visitor and the resident, and a camera for taking an image of the visitor. The intercom system also includes an intercom master which will be simply referred to as a "master" hereinafter, is connected to the slave through a non-polar analog two-wire line and is formed of a display displaying an image taken by a slave imaging unit as well as a microphone and a speaker for speech communications with the visitor. The intercom system further includes a sub-master that can make communications with the visitor similarly to the master, and has substantially the same structure as the master.

Each of the master and the sub-master includes a data compression/expansion unit for compressing or expanding video and audio data provided from the slave, a data communication unit performing simultaneous data transmission and reception between the master and the sub-master, and a control unit controlling data processing, communications and the like. The master and the sub-master are connected together over a Local Area Network (LAN) through communication units that arranged in the master and the sub-master, respectively.

Since the master and the sub-master are connected together through a LAN cable, these can transmit data of sounds, characteristics, images and the like to and from a communication terminal inside an external network when a LAN home gateway connecting the indoor LAN cable to the external network is arranged in or around a house. Likewise, these may be connected to an ISDN (Integrated Service Digital Network) line through a router, a DSU (Digital Service Unit) and the like, and thereby the Internet becomes available (Japanese Patent Laying-Open No. 2003-078629 (Patent Document 1)). The ISDN is a digitized public communications network, and is the integrated services digital network over which a user can use services such as telephone, facsimile, data communications and the like through a single interface.

Another video intercom system is also proposed. This system includes a control unit that connects a camera-equipped intercom slave to a home network connecting a plurality of home electric devices and house facilities together for transmitting and receiving data, and connects the camera-equipped intercom slave to general-purpose devices such as a television receiver, a telephone and the like over the network. There is still another video intercom system (Japanese Patent Laying-Open No. 2004-289657 (Patent Document 2)). In this system, a general-purpose device that cannot be directly connected to the home network is connected to it through a conversion interface block.

There has been a system in which a portable audio terminal for performing speech communications is independent of a video terminal for transmitting and receiving images, and call setting is processed on an management server side so that the portable audio terminal can be combined with the video terminal during speech communications by the portable audio terminal, and can be used as a video telephone. This structure of the video telephone system includes the video terminal for transmitting and receiving images, the audio terminal for transmitting and receiving sounds by radio, wireless-to-wired communications converter terminal for mutual conversion between wireless and wired communications, managing means for managing terminal information about a plurality of video terminals and audio terminals, call control means for controlling calling between the terminals according to the information in the managing means, and a management server formed of communication control means performing communications with the audio and video terminals. In this structure, the management server performs the control until a logical audio data channel opens between the audio terminals and a logical data channel opens between the video terminals (Japanese Patent Laying-Open No. 2004-165949 (Patent Document 3)).

Patent Document 1: Japanese Patent Laying-Open No. 2003-078629
Patent Document 2: Japanese Patent Laying-Open No. 2004-289657
Patent Document 3: Japanese Patent Laying-Open No. 2004-165949

DISCLOSURE OF THE INVENTION

Problems to be Solved by the Invention

In the camera-equipped intercom apparatus disclosed in the patent document 1, it is desired in view of the data transmission method that the master and the sub-master connected thereto over the LAN have the same structure and the same performance, and the intercom apparatus cannot be connected to general-purpose devices arranged in the resident's home, i.e., audio and video devices such as a television, audio devices such as a telephone and a cordless telephone handset, and the like so that it is impossible to transmit the video data, audio data and the like from the slave to an arbitrary one of the devices.

In the patent document 2, the slave of the camera-equipped intercom can be connected to the network, and therefore can perform the data communications using the general-purpose device such as a network-ready indoor master, a television receiver, a video device or a telephone. However, operability and usability thereof are insufficient. For example, when a visitor makes a call with a call button 101 of a camera-equipped intercom slave 100, a home network protocol processing circuit always connects it to the indoor master according to its setting. Therefore, when nobody is around the indoor master, a response to the call cannot be performed. Although various items of the setting information can be changed through a setting information management processing circuit in the control unit of the camera-equipped intercom slave, it is necessary for such changing to use a setting information changing device such as a dedicated controller or a personal computer connected to the home network. Therefore, it is impossible to perform such operations that a user responds to the call and starts speech communications with a visitor through an arbitrary audio terminal, and designates an arbitrary video terminal during the speech communications for displaying images of the visitor, e.g., on a large screen of a television receiver near the user.

The patent document 3 has disclosed the video telephone system, in which the portable audio terminal for speech communications is independent of the video terminal for transmitting and receiving the images, and these can be used in a combined fashion. However, the patent document 3 has not disclosed the use of the intercom system having the imaging function.

Thus, it has not disclosed an intercom system that having the imaging function and can be conveniently used when audio and video data provided from the slave having the imaging function is received by an arbitrary one of the existing general-purpose devices such as video and audio devices (e.g., a television receiver and a cellular phone in the resident's home) and the audio devices (e.g., a telephone and a cordless handset). For example, such a system has not been disclosed that the user can check a visitor on the video terminal near the user, and can use the audio terminal near the user for responding to the call provided from the slave.

The invention has been developed in view of the above matters, and an object of the invention is to provide a user-friendly intercom system having an imaging function, and to allow use of arbitrary general-purpose devices already arranged in a home of a resident.

Means for Solving the Problems

The invention provides the first intercom system with an imaging function including: an intercom slave having imaging means, audio input means, audio output means and calling means for issuing a call signal; a home gateway device controlling communications connection between devices capable of wired or wireless communications over a local area network; an intercom adapter connected to the intercom slave, and having signal converting means for converting an analog signal provided from the intercom slave into a digital signal transmittable to the local area network side, and converting a signal transmitted from the local area network side into a signal receivable by the intercom slave; an audio terminal being capable of transmission and reception with respect to the home gateway device, and having call responding means for responding to a call signal provided from the intercom slave, and means for audio communications with the intercom slave; and a video terminal capable of transmission and reception with respect to the home gateway device, and having image display means for receiving a video signal from the intercom slave, and displaying an image based on the received video signal, wherein the audio terminal has video terminal selecting means for selecting or deselecting the video terminal, the home gateway device has terminal registering means for registering the audio terminal and the video terminal capable of communications with the intercom slave, when the intercom slave issues the call signal, the home gateway device transmits the call signal to the audio terminal registered in the terminal registering means, and transmits the video signal provided from the intercom slave having issued the call signal to the video terminal registered in the terminal registering means, and when one of the audio terminals receiving the call signal responds to the call signal, the home gateway device stops transmission of the call signal and transmission of the video signal provided from the intercom slave having issued the call signal to the video terminal registered in the terminal registering means, performs control to allow bidirectional communications between the audio terminal having responded to the call signal and the intercom slave having issued the call signal, performs control to allow communications between the video terminal selected by the video terminal selecting means of the audio terminal responded to the call signal and the intercom slave having issued the call signal, and causes the video terminal selected by the audio terminal to display the image based on the video signal provided from the intercom slave having issued the call signal.

As described above, first the intercom system with an imaging function according to the invention includes the intercom slave having the imaging means, the audio input means, the audio output means and the calling means for issuing the call signal; the home gateway device controlling communications connection between the devices capable of wired or wireless communications over the local area network; the intercom adapter connected to the intercom slave, and having the signal converting means for converting the analog signal provided from the intercom slave into the digital signal transmittable to the local area network side, and converting the signal transmitted from the local area network side into the signal receivable by the intercom slave; the audio terminal being capable of transmission and reception with respect to the home gateway device, and having the call responding means for responding to the call signal provided from the intercom slave, and the means for audio communications with the intercom slave; and the video terminal capable of transmission and reception with respect to the home gateway device, and having the image display means for receiving the video signal from the intercom slave, and displaying the image based on the received video signal. The audio terminal has the video terminal selecting means, which selects or deselects the video terminal. The home gateway device has the terminal registering means, which registers the audio terminal and the video terminal capable of communications with the intercom slave. When the intercom slave issues the call signal, the home gateway device transmits the call signal to the audio terminal registered in the terminal registering means, and transmits the video signal provided from the intercom slave having issued the call signal to the video terminal registered in the terminal registering means. When one of the audio terminals receiving the call signal responds to the call signal, the home gateway device stops transmission of the call signal and transmission of the video signal provided from the intercom slave having issued the call signal to the video terminal registered in the terminal registering means, performs the control to allow the bidirectional communications between the audio terminal having responded to the call signal and the intercom slave having issued the call signal, performs the control to allow the communications between the video terminal selected by the video terminal selecting means of the audio terminal having responded to the call signal and the intercom slave having issued the call signal, and causes the video terminal selected by the audio terminal to display the image based on the video signal provided from the intercom slave having issued the call signal.

According to the invention, the second intercom system with the imaging function has the structures of the first intercom system with the imaging function, and further is configured such that the terminal registering means registers a combination of the video terminal selected according to a selection instruction of the video terminal selecting means and the audio terminal performing the selection instruction in a terminal combination registration table, the terminal registering means deletes the video terminal deselected according to a deselection instruction of the video terminal selecting means and the audio terminal instructing the deselection from the terminal combination registration table, and the home gateway device handles the video terminal registered in the combined fashion together with the audio terminal instructing the selection in the terminal combination registration table as the video terminal selected by the video terminal selecting means of the audio terminal instructing the selection, performs control to allow communications between the video terminal and the intercom slave having issued the call signal, and causes the video terminal to display the image based on the video signal provided from the intercom slave having issued the call signal.

As described above, the second intercom system with the imaging function achieves the operations of the first intercom system with the imaging function, and further achieves the following operations. The terminal registering means registers the combination of the video terminal selected according to the selection instruction of the video terminal selecting means and the audio terminal performing the selection instruction in the terminal combination registration table. The terminal registering means deletes the video terminal deselected according to the deselection instruction of the video terminal selecting means and the audio terminal instructing the deselection from the terminal combination registration table. The home gateway device handles the video terminal registered in the combined fashion together with the audio terminal instructing the selection in the terminal combination registration table as the video terminal selected by the video terminal selecting means of the audio terminal instructing the selection, and performs the control to allow the communications between the video terminal and the intercom slave having issued the call signal. Further, it causes the video terminal to display the image based on the video signal provided from the intercom slave having issued the call signal.

According to the invention, the third intercom system with the imaging function has the structures of the first intercom system with the imaging function, and further is configured such that the audio terminal further includes display means, the display means displays the list of the video terminals registered as the video terminals in the terminal registering means when the audio terminal having responded to the call signal selects the video terminal by the video terminal selecting means, and the video terminal is selected by the user from the list of the video terminals displayed by the display means.

As described above, the third intercom system with the imaging function achieves the operations of the first intercom system with the imaging function, and further achieves the following operations. The audio terminal further includes display means, the display means displays the list of the video terminals registered as the video terminals in the terminal registering means when the audio terminal having responded to the call signal selects the video terminal by the video terminal selecting means. The video terminal is selected by the user from the list of the video terminals displayed by the display means.

According to the invention, the fourth intercom system with the imaging function has the structures of the first intercom system with the imaging function, and further is configured such that the video terminal registered in the terminal registering means and being capable of receiving the radio wave further includes received wave intensity determining means for determining a reception intensity of each of the video terminals receiving the radio wave emitted from the audio terminal having responded to the call signal, and received wave intensity reporting means for reporting the received wave intensity determined by the received wave intensity determining means to the home gateway device, and when one of the audio terminals responds to the call signal provided from the intercom slave, the home gateway device requests each of the video terminals including the received wave intensity reporting means to provide the report about the received wave intensity determined by the received wave intensity determining means, and the home gateway device handles the video terminal exhibiting the highest received wave intensity among the video terminals providing the reports as the video terminal selected by the video terminal selecting means of the audio terminal having responded to the call signal, performs control to allow communications between the video terminal and the intercom having issued the call signal, and causes the video terminal to display the image based on the video signal provided from the intercom slave having issued the call signal.

As described above, the fourth intercom system with the imaging function achieves the operations of the first intercom system with the imaging function, and further achieves the following operations. The video terminal registered in the terminal registering means and being capable of receiving the radio wave further includes the received wave intensity determining means, and this received wave intensity determining means determines the reception intensity of each of the video terminals receiving the radio wave emitted from the audio terminal having responded to the call signal. The received wave intensity reporting means included in the above video terminal reports the received wave intensity determined by the received wave intensity determining means to the home gateway device. When one of the audio terminals responds to the call signal provided from the intercom slave, the home gateway device requests each of the video terminals including the received wave intensity reporting means to provide the report about the received wave intensity determined by the received wave intensity determining means. The home gateway device handles the video terminal exhibiting the highest received wave intensity among the video terminals providing the reports as the video terminal selected by the video terminal selecting means of the audio terminal having responded to the call signal. Also, the home gateway device performs control to allow communications between the video terminal and the intercom having issued the call signal. Further, the home gateway device causes the video terminal to display the image based on the video signal provided from the intercom slave having issued the call signal.

According to the invention, the audio terminal forming one of the first to fourth intercom systems with the imaging functions is configured such that the audio terminal includes the video terminal selecting means described above.

As described above, the audio terminal of the invention forms one of the first to fourth intercom systems with the imaging functions, and includes the video terminal selecting means described above.

According to the invention, the home gateway device forming one of the first to fourth intercom systems with the imaging functions is configured such that the home gateway device has the terminal registering means; when the intercom slave issues the call signal, the home gateway device transmits the call signal to the audio terminal registered in the terminal registering means, and transmits the video signal provided from the intercom slave having issued the call signal to the video terminal registered in the terminal registering means; and when one of the audio terminals receiving the call signal responds to the call signal, the home gateway device stops transmission of the call signal and transmission of the video signal provided from the intercom slave having issued the call signal to the video terminal registered in the terminal registering means, performs control to allow bidirectional communications between the audio terminal having responded to the call signal and the intercom slave having issued the call signal, performs control to allow communications between the video terminal selected by the video terminal selecting means of the audio terminal having responded to the call signal and the intercom slave having issued the call signal, and causes the video terminal selected by the audio terminal to display the image based on the video signal provided from the intercom slave having issued the call signal.

As described above, the home gateway device of the invention forms one of the first to fourth intercom systems with the imaging functions, and includes the terminal registering means. When the intercom slave issues the call signal, the home gateway device transmits the call signal to the audio terminal registered in the terminal registering means, and transmits the video signal provided from the intercom slave having issued the call signal to the video terminal registered in the terminal registering means. When one of the audio terminals receiving the call signal responds to the call signal, the home gateway device stops transmission of the call signal and transmission of the video signal provided from the intercom slave having issued the call signal to the video terminal registered in the terminal registering means. Also, it performs control to allow bidirectional communications between the audio terminal having responded to the call signal and the intercom slave having issued the call signal. Further, it performs control to allow communications between the video terminal selected by the video terminal selecting means of the audio terminal having responded to the call signal and the intercom slave having issued the call signal. Further, it causes the video terminal selected by the audio terminal to display the image based on the video signal provided from the intercom slave having issued the call signal.

The intercom adapter according to the invention forms one of the first to fourth intercom systems with the imaging functions, and is configured such that the intercom adapter is connected to the intercom slave, and includes the signal converting means.

As described above, the intercom adapter according to the invention forms one of the first to fourth intercom systems with the imaging functions, and is configured such that the intercom adapter is connected to said intercom slave, and includes the signal converting means.

The video terminal according to the invention forms one of the first to fourth intercom systems with the imaging functions, and is configured such that the video terminal is registered as the video terminal in the terminal registering means of the home gateway device; the video terminal further includes wave receiving means allowing reception of a radio wave, received wave intensity determining means for determining a reception intensity of the wave emitted from the audio terminal having responded to the call signal, and received wave intensity reporting means for reporting the received wave intensity determined by the received wave intensity determining means to the home gateway device; and when one of the audio terminals responds to the call signal provided from the intercom slave, and the home gateway device requests reporting of the received wave intensity, the received wave intensity reporting means transmits a result of the reception intensity determination performed by the received wave intensity determining means. As described above, the video terminal according to the invention forms one of the first to fourth intercom systems with the imaging functions, and is configured such that the video terminal is registered as the video terminal in the terminal registering means of the home gateway device. The wave receiving means allows reception of the radio wave. The received wave intensity determining means determines the reception intensity of the wave emitted from the audio terminal having responded to the call signal.

The received wave intensity reporting means reports the received wave intensity determined by the received wave intensity determining means to the home gateway device. When one of the audio terminals responds to the call signal provided from the intercom slave, and the home gateway device requests reporting of the received wave intensity, the received wave intensity reporting means transmits a result of the reception intensity determination performed by the received wave intensity determining means.

Effects of the Invention

The intercom system with the imaging function according to the invention can be user-friendly. For example, a user can respond to a call of a visitor through the nearby audio terminal while checking the visitor of which image is taken by the intercom slave and displayed on the nearby video terminal. When the user responds through the audio terminal to the call provided from intercom slave, the image taken by the intercom slave is displayed on the designated video terminal. An appropriate one(s) of general-purpose devices already arranged in a home of a resident may be used.

BRIEF DESCRIPTION OF THE DRAWINGS

FIG. 6A is a local terminal management table in the embodiment.

FIG. 6B is a terminal combination registration table in the embodiment,

DESCRIPTION OF THE REFERENCE SIGNS

1 camera-equipped intercom slave, 2 intercom adapter, 3 home gateway, 4 LAN cable, 5 non-polar analog two-wire line, 6 video terminal E, 11 slave camera, 12 call switch, 13 slave microphone, 14 slave speaker, 15 slave modem multiplexing unit, 21 modem demultiplexing unit, 22 control unit, 23 recording unit, 24 data communication unit, 31 PSTN interface, 32 PSTN line control unit, 33 WAN interface, 34 WAN-side communication control unit, 35 audio processing unit, 36 video processing unit, 37 LAN-side communication control unit, 38 wireless control unit, 39 wireless LAN interface, 60 wired LAN interface, 61 user interface control unit, 62 setting information storage, 63 analog telephone control unit, 64 analog telephone interface, 65 system control unit

BEST MODES FOR CARRYING OUT THE INVENTION

Preferred embodiments of an intercom system having an imaging function will be described below with reference to the drawings.

Figure 1:
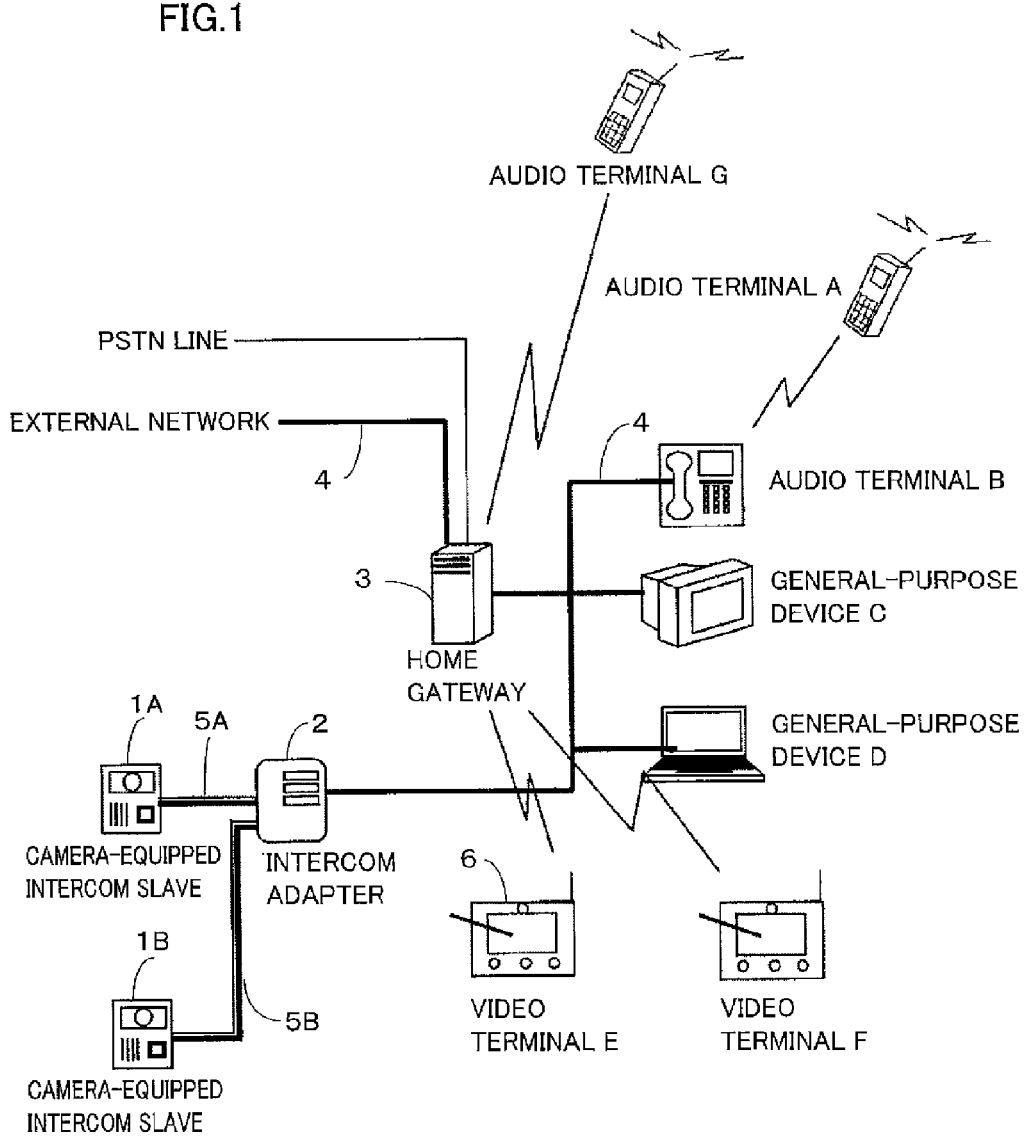
FIG. 1 shows a structure of an intercom system with an imaging function in an embodiment.

FIG. 1 shows the intercom system having the imaging function of the embodiment. In FIG. 1, the intercom system having the imaging function of the embodiment includes two camera-equipped intercom slaves 1A and 1B (which are generally indicated by "1" when discrimination between them is not necessary), an intercom adapter 2, a home gateway 3, audio terminals A, B and C, general-purpose devices C and D, and video terminals E6 and F, 4 indicates a connection line of a wired LAN (Local Area Network: general information communications network within a restricted area, e.g., in a single site (building)) of the Ethernet (registered trademark) standards employed for connecting intercom adapter 2, home gateway 3, audio terminal B and general-purpose devices C and D. This connection cable 4 is, e.g., an Ethernet (registered trademark) UTP cable which will be simply referred to as a "LAN cable" hereinafter. Camera-equipped intercom slaves 1 are connected to intercom adapter 2 through two-wire cables 5A and 5B, respectively, which will be generally indicated by "5" when discrimination between them is unnecessary.

Audio terminal B is, e.g., a master of a cordless telephone, and audio terminal A is a slave of the cordless telephone, and can perform wireless communications with the master of the cordless telephone. Audio terminal G is, e.g., a cellular phone, and can perform the cordless communications through home gateway 3. General-purpose device C is a video output device such as a television receiver, a television monitor or a personal computer monitor. General-purpose device D is, e.g., a personal computer. Video terminals E and F are, e.g., video telephones, and can perform wireless communications through home gateway 3. Video terminal E6 will now be described as video terminal 6.

Since the system is configured to allow communications through home gateway 3 with a line of a PSTN (Public Switched Telephone Networks) and a WAN (Wide Area Network), the system can perform the communications with general telephones and external networks such as the Internet. Thus, the system can perform data communications for sounds, characters, images and the like with communication terminals on the external networks.

Figure 3:
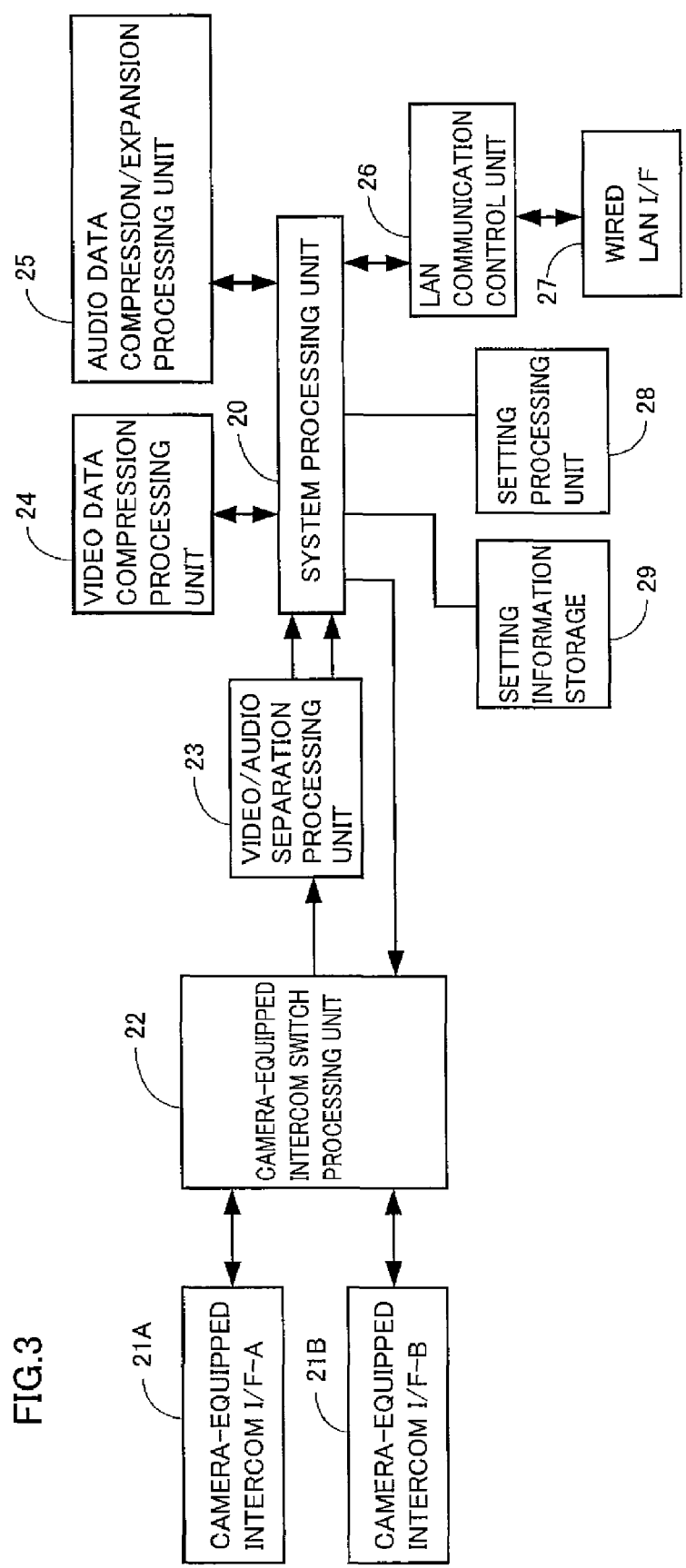
FIG. 3 is a block diagram showing a structure of an intercom adapter in the embodiment.

Although FIG. 1 shows the case where two camera-equipped intercom slaves 1 (1A and 1B) are arranged, a camera-equipped intercom switch processing unit 22 is arranged on intercom adapter 2 side so that it can select camera-equipped intercom slave 1 to be connected from among the plurality of camera-equipped intercom slaves 1A and 1B as illustrated in FIG. 3. A plurality of combinations such as a combination of camera-equipped intercom slave 1' and an intercom adapter 2' other than the above may be connected to LAN cable 4. Further, home gateway 3 and intercom adapter 2 may be integrated. Usually, camera-equipped intercom slave 1 is arranged outdoors, e.g., at an entrance of a house or a gate, and intercom adapter 2 is arranged inside a room of a resident.

Figure 2:
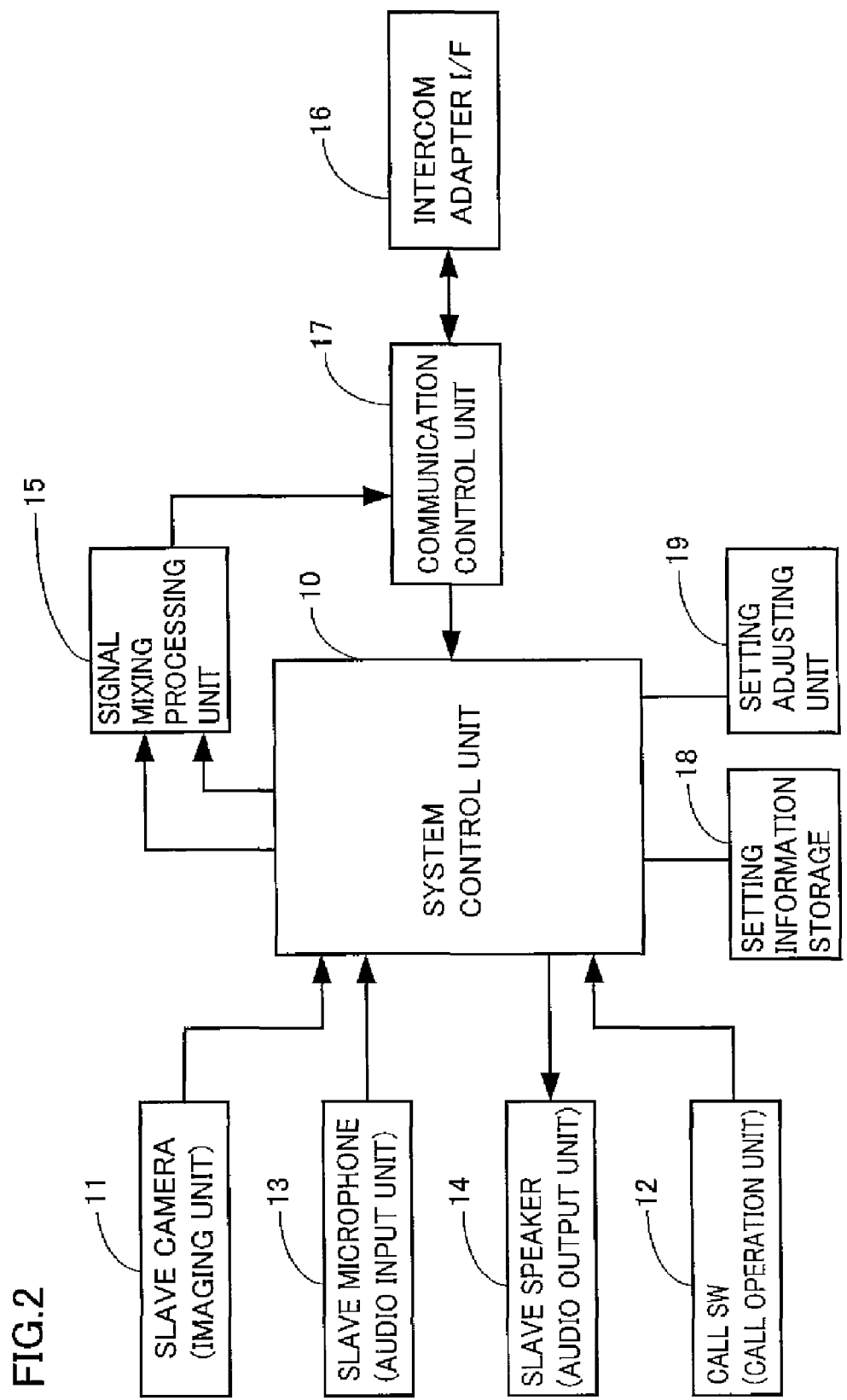
FIG. 2 is a block diagram showing a structure of a camera-equipped intercom slave in the embodiment.

As shown in FIG. 2, camera-equipped intercom slave 1 includes a slave camera (imaging unit) 11 that is arranged outdoors, e.g., at an entrance for taking images of a visitor, a call switch (call operation unit) 12 that can be used by a visitor for calling the resident (and may also be referred to as a "call SW" hereinafter), a slave microphone (voice input unit) 13 for performing speech communications with the resident and a slave speaker (audio output unit) 14. Camera-equipped intercom slave 1 further includes a signal mixing processing unit 15 that mixes a video analog signal provided from slave camera 11 with an audio analog signal provided from slave microphone 13, an intercom adapter interface (IN) 16 that is an interface on camera-equipped intercom slave 1 side with respect to two-wire cables 5 connected to intercom adapter 2, a communication control unit 17 controlling communications performed for transmitting a signal that indicates generation of the mixture signal by signal mixing processing unit 15 or generation of a call signal by call switch 12 (and will be referred to as a "call generation signal" hereinafter) to intercom adapter 2 through intercom adapter interface 16, and also controlling communications performed for providing the audio signal transmitted from intercom adapter 2 through intercom adapter interface 16 to slave speaker (audio output unit) 14, a setting adjusting unit 18 that adjusts volumes of transmitted and received sounds, a setting information storage 19 that stores values set by setting adjusting unit 18 and a control device of a system control unit 10 controlling whole camera-equipped intercom slave 1.

A signal flow in camera-equipped intercom slave 1 will now be described. First, call switch 12 depressed by a user generates a call signal, and system control unit 10 senses this call signal. System control unit 10 that has sensed the call signal starts to receive the video analog signal provided from slave camera 11 and the audio analog signal provided from slave microphone 13. Signal mixing processing unit 15 mixes the video and audio analog signals thus received with each other. Communication control unit 17 transmits a signal (a call generation signal) indicating the generation of the mixed video/audio signal prepared by signal mixing processing unit 15 and the call signal provided by call switch 12, and particularly transmits these signals to intercom adapter 2 through intercom adapter interface 16. Further, communication control unit 17 receives the audio signal provided from intercom adapter 2 through intercom adapter 2, and transmits it to slave speaker (audio output unit) 14.

As shown in FIG. 3, intercom adapter 2 includes the two camera-equipped intercom interfaces 21A (I/F-A) and 21B (I/F-B) that are interfaces with respect to two-wire cables 5A and 5B connected to two camera-equipped intercom slaves 1A and 1B, respectively. Although FIG. 3 shows two camera-equipped intercom interfaces 21A (I/F-A) and 21B (I/F-B) in an independent fashion, these will be generally referred to as "camera-equipped intercom interfaces 21" when discrimination between them is not necessary. Intercom adapter 2 further includes camera-equipped intercom switch processing unit 22 for selecting two camera-equipped intercom interfaces 21, a video/audio separation processing unit 23 performing video/audio separation on the analog signal including the video and audio signals mixed together and provided from camera-equipped intercom slave 1, video data compression processing unit 24 that performs digital conversion on the separated video analog signal, audio data compression/ expansion processing unit 25 that performs digital conversion on the separated audio data and performs analog conversion on the digital audio signal sent through LAN cable 4 (see FIG. 1), a wired LAN interface 27 that is an interface arranged on the intercom adapter 2 side of LAN cable 4 connected to installed devices, a LAN communication control unit 26 for controlling the communications between intercom adapter 2 and home gateway 3 through LAN cable 4, setting processing unit 28 performing various settings on intercom adapter 2, a setting information storage 29 that stores values set by setting processing unit 28 and a system control unit 20 that controls whole intercom adapter 2.

A signal flow in intercom adapter 2 will be described below. First, description will be given on the case where intercom adapter 2 receives the mixed video/audio signal from camera-equipped intercom slave 1. When intercom adapter 2 receives the signal (the call generation signal) indicating the generation of the call signal through intercom interface 21A (I/F-A) or 21B (I/F-B), camera-equipped intercom switch processing unit 22 selects the connection to camera-equipped intercom interface 21 receiving the signal. This connection is kept until the speech communications end processing is performed.

Then, intercom adapter 2 receives, through camera-equipped intercom switch processing unit 22, the video/audio signal provided from camera-equipped intercom interface 21 that is connected by camera-equipped intercom switch processing unit 22, and transmits it to video/audio separation processing unit 23. Video/audio separation processing unit 23 separates the video signal and the audio signal from the received video/audio signal (mixed signal), and transmits the video and audio signals thus separated to system control unit 20. System control unit 20 transmits the separated analog video signal to video data compression processing unit 24 for compression into a digital form. Also, system control unit 20 transmits the separated analog audio signal to audio data compression/expansion processing unit 25 for compression into a digital form. The compressed digital video and audio signals are returned to system control unit 20, and are transmitted to LAN communication control unit 26. LAN communication control unit 26 transmits the call generation signal as well as the compressed digital video signal and the compressed digital audio signal to home gateway 3 through wired LAN interface 27 and LAN cable 4.

Conversely, LAN communication control unit 26 receives through wired LAN interface 27 the digital audio signal that is transmitted from home gateway 3 through LAN cable 4. LAN communication control unit 26 transmits the received digital audio signal to system control unit 20. System control unit 20 transmits the received digital audio signal to audio data compression/expansion processing unit 25, which expands it into the analog audio signal, and returns the analog audio signal to system control unit 20. System control unit 20 transmits the analog audio signal to camera-equipped intercom slave 1 through camera-equipped intercom switch processing unit 22 and camera-equipped intercom interface 21 connected thereto.

Figure 4:
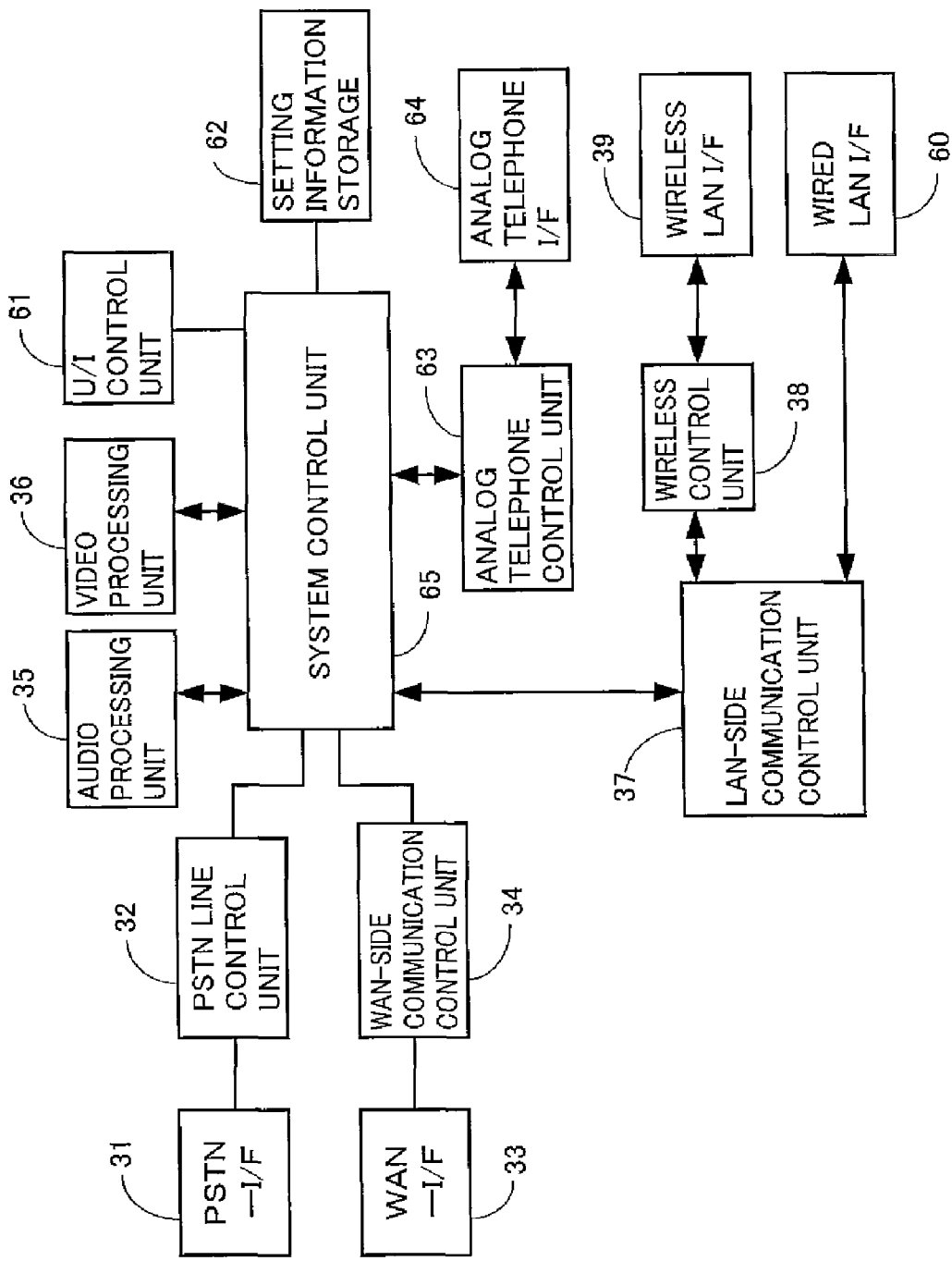
FIG. 4 is a block diagram showing a structure of a home gateway in the embodiment.

FIG. 4 is a block diagram showing an internal structure of home gateway 3. The gateway is a device that allows communications by mutually converting data items of different mediums or protocols on the network, and allows the connection between different kinds of devices or the like by absorbing the difference in communication medium and transmission method.

Referring to FIG. 4, internal structure blocks of home gateway 3 will now be described. A PSTN interface (PSTN-I/F) 31 is an interface (modular jack) for connecting the PSTN line, and a PSTN line control unit 32 accommodates the PSTN and allows calling and receiving. A WAN interface (WAN-I/F) 33 is employed for connection to an external network. A WAN-side communication control unit 34 is employed for performing communications with the external network of the WAN, and has a network protocol processing circuit and a communications protocol processing circuit. The protocol is a set of conventions determined for communications between computers over the network An audio processing unit 35 is an audio signal control unit for allowing the transmission and reception of sounds and voices to and from camera-equipped intercom slave 1. A video processing unit 36 is a video signal control unit for allowing transmission and reception of images to and from camera-equipped intercom slave 1.

A LAN-side communication control unit 37 is employed for allowing home gateway 3 to establish the connection through LAN cable 4 to the devices on the LAN side such as intercom adapter 2, audio terminal B (audio terminal A) and general-purpose devices C and D, and thereby to perform communications through the wireless LAN with the devices arranged on the LAN side such as audio terminal G and video terminals E6 and F. A wireless control unit 38 is employed for allowing home gateway 3 to perform the communications through the wireless LAN with the devices arranged on the LAN side. A wireless LAN interface 39 is employed for performing the communications through the wireless LAN with the devices arranged on the LAN side. A wired LAN interface 60 is employed for connection through LAN cable 4 to the devices arranged on the LAN side.

A user interface (U/I) control unit 61 is employed for performing various settings in the camera-equipped intercom system. Generally, it has neither a key for operation nor a display, and is configured to perform the various setting through a browser on a personal computer arranged on the LAN side in many cases. In this structure, user interface control unit 61 corresponds to an HTTP server for performing the various settings described above. The browser is application software for browsing Web pages, and can operate to download HTML files, image files, music files and others over the Internet, and to display or reproduce them by analyzing layouts. The HTTP (Hypertext Transfer Protocol) is the communications protocol or procedures for transmitting and receiving the data between the Web server and clients (Web browsers and the like), and can perform transmission and reception of the files of images, sounds, images and the like associated with text together with representation formats. HTML (HyperText Markup Language) is a language for describing the Web pages, and allows embedding of hyperlink and the like to the image, sound, image and/or another text in the text.

A setting information storage 62 stores various setting information items of the camera-equipped intercom system, and stores, e.g., a "local terminal management table" in FIG. 6A that is information about terminals registered in the camera-equipped intercom system as well as a "terminal combination registration table" in FIG. 6B that is information about a correlation between the audio terminals and the video terminals designated by the audio terminals. An analog telephone control unit 63 is employed for connecting an analog telephone to home gateway 3. When a cordless telephone is an analog telephone, its master (audio terminal B) can be connected to analog telephone control unit 63 so that the user can respond to the call from camera-equipped intercom slave 1 and can perform speech communications through a slave (audio terminal A) of the cordless telephone. An analog telephone interface (I/F) 64 is a modular jack for connecting the analog telephone. A system control unit 65 controls whole home gateway 3.

A signal flow in home gateway 3 will be described below. When home gateway 3 receives the call generation signal transmitted through LAN cable 4 from intercom adapter 2 arranged on the same LAN as well as the digital video signals and compressed digital audio signals transmitted through wired LAN interface 60, LAN-side communication control unit 37 transmits them to system control unit 65. When the compressed digital audio signal is transmitted from intercom adapter 2 through wired LAN interface 60 or through wireless control unit 38 and wireless LAN interface 39 to the audio terminal having responded to the call generation signal transmitted from intercom adapter 2, LAN-side communication control unit 37 controls such transmission of the compressed digital audio signal.

The audio terminals that can perform the speech communications with camera-equipped intercom slave 1 through wired LAN interface 60 may be, e.g., audio terminal B (cordless telephone master) and audio terminal A (cordless telephone slave) when these are digital audio terminals as well as general-purpose device D (personal computer) that is equipped with a microphone and can perform speech communications using digital audio signals. The audio terminal that can perform the speech communications with camera-equipped intercom slave 1 through wireless control unit 38 and wireless LAN interface 39 may be digital audio terminal G (cellular phone) as well as video terminals E6 and F that can be used as video telephones.

Conversely when the audio data transmitted from the audio terminal arranged on the same LAN is transmitted to camera-equipped intercom slave 1, signals flow in home gateway 3 as follows. LAN-side communication control unit 37 controls the operation, in which system control unit 65 receives the compressed digital audio signal from the audio terminal through wired LAN interface 60 or through wireless LAN interface 39 and wireless control unit 38. For transmitting the received audio signal to intercom adapter 2, system control unit 65 transmits it to LAN-side communication control unit 37. LAN-side communication control unit 37 transmits the audio signal through wired LAN interface and LAN cable 4 to intercom adapter 2.

When audio terminal B (cordless telephone master) or audio terminal A (cordless telephone slave) is an analog audio terminal and responded to the call generation signal transmitted from intercom adapter 2, the compressed digital audio signal transmitted from intercom adapter 2 is transmitted from system control unit 65 to analog telephone control unit 63, is expanded thereby into an analog form and is transmitted through analog telephone interface 64 to audio terminal B or A. Conversely, the audio signal emitted from audio terminal B or A is transmitted through analog telephone interface 64, is compressed into a digital from by analog telephone control unit 63 and is transmitted to system control unit 65. System control unit 65 transmits the received audio signal to LAN-side communication control unit 37 for transmitting it to intercom adapter 2. LAN-side communication control unit 37 transmits the audio signal through wired LAN interface 60 and LAN cable 4 to intercom adapter 2.

Figure 5:
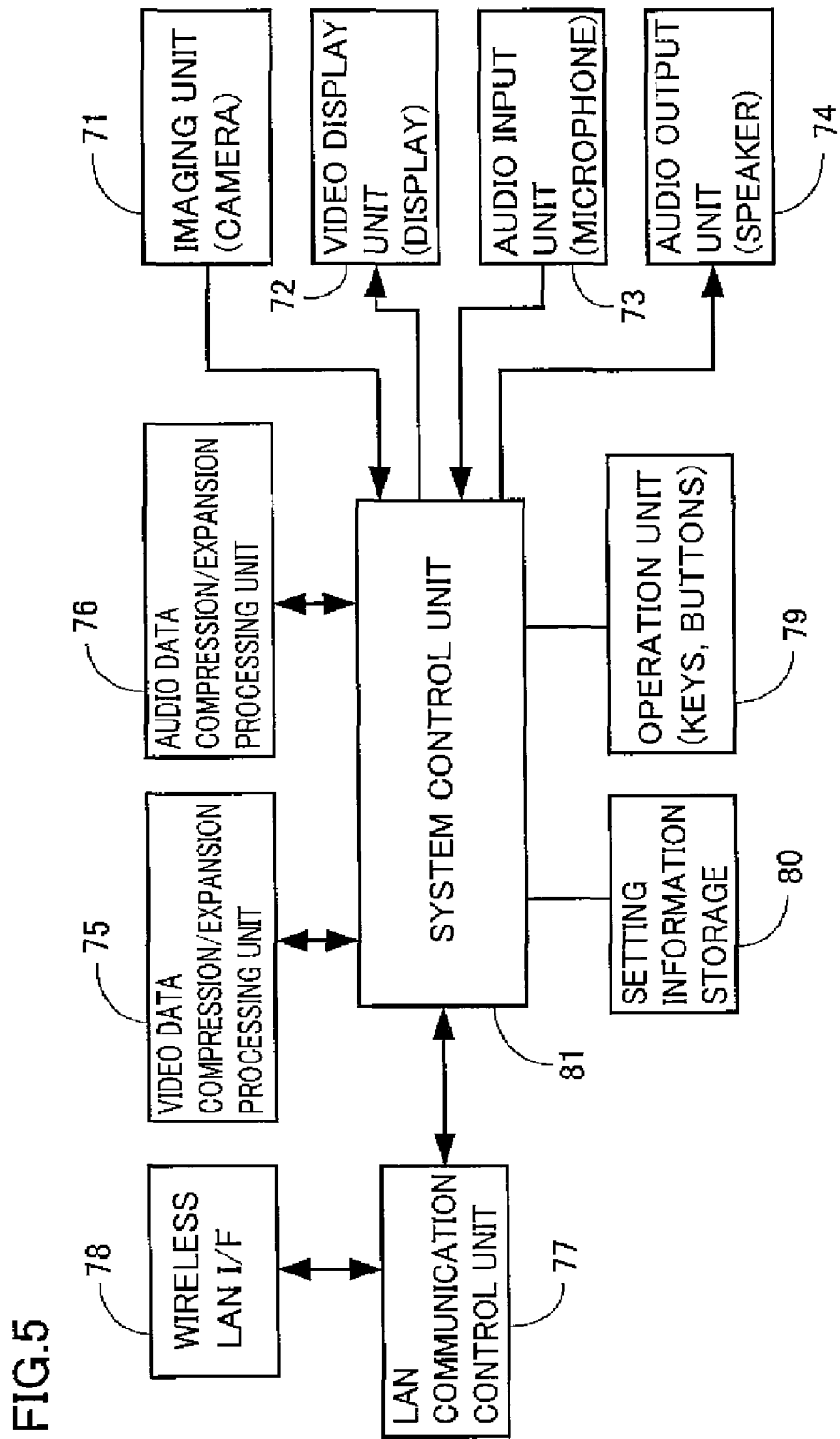
FIG. 5 is a block diagram showing a structure of a video terminal in the embodiment.

For example, as shown in FIG. 5, video terminal 6 that is a video telephone (video terminal E6) includes an imaging unit (camera) 71 for performing video telephone communications, a display 72 for performing video telephone communications, an audio input unit (microphone) 73 for speech communications, an audio output (speaker) 74 for speech communications, a video data compression/expansion processing unit 75 for compressing the video signal of images taken by imaging unit 71 or expanding the video signal received from home gateway 3, an audio data compression/expansion processing unit 76 for compressing the sound provided from audio input unit 73 or expanding the audio data received from home gateway 3, a LAN communication control unit 77 for connection to home gateway 3, a wireless LAN interface 78 for connection to home gateway 3 over the wireless LAN, an operation unit (keys, buttons and the like) 79 for responding to the call generation signal transmitted from camera-equipped intercom slave 1 and for making and taking calls, a storage 80 storing various setting information items of video terminal 6 and a system control unit 81 controlling video terminal 6. When the video signal provided from imaging unit 71 is an analog signal, video data compression/expansion processing unit 75 converts the video signal into a digital signal. When video display 72 is configured to receive the analog video signal, video data compression/expansion processing unit 75 converts the received digital video signal into an analog signal. Likewise, audio data compression/expansion processing unit 76 converts the analog audio signal provided from audio input unit 73 into the digital signal, and converts the received digital audio signal into the analog signal.

A signal flow in video terminal E6 will now be described. The video and audio signals received by wireless LAN interface 78 are provided to system control unit 81 through LAN communication control unit 77. System control unit 81 expands the received digital video signal by video data compression/expansion processing unit 75, and transmits it to video display 72 for displaying. When video display 72 is configured to display the analog signal, video data compression/expansion processing unit 75 expands the digital signal and converts it into an analog form. System control unit 81 expands the received digital audio signal by audio data compression/expansion processing unit 76, converts the digital signal into the analog signal and transmits it to audio output (speaker) 74 for outputting the sound.

When system control unit 81 receives the video signal provided from imaging unit (camera) 71, it transmits the video signal to video data compression/expansion processing unit 75 for compressing and digitizing it, and then transmits the digital video signal through LAN communication control unit 77 and wireless LAN interface 78 to home gateway 3. The video signal provided from imaging unit (camera) 71 can be displayed by another video terminal. In this embodiment, a video display is not employed in camera-equipped intercom slave 1, and therefore is unavailable. However, camera-equipped intercom slave I may be provided with a video display for displaying images of the video signal that is provided from imaging unit (camera) 71. When system control unit 81 receives the audio signal provided from audio input unit (microphone) 73, it transmits the audio signal to audio data compression/expansion processing unit 76 for compressing and digitizing it, and then transmits the compressed digital audio signal to home gateway 3 through LAN communication control unit 77 and wireless LAN interface 78.

Although the structure of the audio terminal and its signal flow are not shown, these are substantially the same as those of the video terminal in FIG. 5 except for that imaging unit (camera) 71 is not usually employed. When video display 72 is not employed, video data compression/expansion processing unit 75 is not employed. In FIG. 5, since video terminal E6 that is the video telephone connected to home gateway 3 over the wireless LAN is employed, only wireless LAN interface 78 connected to LAN communication control unit 77 is shown. However, a wired LAN interface is also employed for allowing communications with home gateway 3 through LAN cable 4. This structure is similarly employed also in the case where the video terminal is connected over the wired LAN.

Description will now be given on a signal flow that occurs in a call operation of the intercom system with the imaging function of this embodiment. When the call switch of camera-equipped intercom slave 1 is depressed, the call generation signal is provided to home gateway 3 through intercom adapter 2, and further is provided to each terminal that can respond to it as the audio terminal. In FIG. 1, the call generation signal is provided to audio terminal G (cellular phone), audio terminal B (cordless telephone master), audio terminal A (cordless telephone slave) receiving the signal through audio terminal B, general-purpose device D (personal computer), video terminal E (video telephone) 6 and video terminal F (video telephone).

Home gateway 3 has held a local terminal management table illustrated in FIG. 6A, and uses it for determining whether the call generation signal and the video signal can be transmitted or not. According to FIG. 6A, home gateway 3 transmits the call generation signal to the terminal(s) which are determined as the terminals capable of "audio communications" or the "video and audio communications" in FIG. 6A, and thereby causes each terminal to ring. Home gateway 3 transmits the video signal to the terminal(s) which are determined as the terminals capable of "video and audio communications" according to the local terminal management table illustrated in FIG. 6-a, and thereby causes the terminals to display an image of a visitor.

At the same time as the issuance of the call generation signal, slave microphone (audio input unit) 13 of camera-equipped intercom slave 1 provides the audio signal to intercom adapter 2. However, the audio signal provided to slave microphone (audio input unit) 13 is not transmitted to home gateway 3 until a response to the call generation signal is made by any one of the terminals that can operate as the audio terminals for responding.

At the same time as the provision of the call generation signal, the analog video signal of the image provided from slave camera (imaging unit) 11 of camera-equipped intercom slave 1 is transmitted to intercom adapter 2. Video data compression processing unit 24 in intercom adapter 2 compresses the analog video signal into a digital form. The digitized video signal is transmitted to home gateway 3, and further is transmitted to the video terminals. In FIG. 1, the video signal is received by the four video terminals, i.e., general-purpose device C (video output device), general-purpose device D (personal computer), video terminal E (video telephone) 6 and video terminal F (video telephone).

Description will now be given on a signal flow that occurs in a responding operation of the audio terminal in the intercom system with the imaging function of the embodiment. When a user performs a responding operation on one of the audio terminals in response to the notification by the call generation signal, intercom adapter 2 connects the audio communications path to home gateway 3, which connects the audio communications path to the responded audio terminal, i.e., the audio terminal that have made the response. Further, intercom adapter 2 starts to transmit a voice to camera-equipped intercom slave 1. As a result of the above processing, the audio signal provided from camera-equipped intercom slave 1 is digitized by intercom adapter 2, and then is transmitted through home gateway 3 to the responded audio terminal. Also, the audio signal provided from the responded audio terminal is transmitted through home gateway 3 to intercom adapter 2, and is transmitted to camera-equipped intercom slave 1 after being converted into the analog form. At this point in time, the audio communications path is established between camera-equipped intercom slave 1 and the audio terminal.

When one of the audio terminals is operated to respond to the call generation signal, this operation temporarily stops the provision of the call generation signal to the respective terminals as well as the transmission of the video signal that has been transmitted to the respective video terminals. When it is assumed that audio terminal A (cordless telephone slave) have responded to the call generation signal, it is impossible to transmit the video signal to audio terminal A because it does not have the function as the video terminal. Audio terminal A (cordless telephone slave) is a slave of audio terminal B (cordless telephone master), and cannot be directly called from home gateway 3 so that it is not described in the local terminal management table in FIG. 6A. However, audio terminal A can perform the speech communications through its master, i.e., audio terminal B. Therefore, by reading the information about audio terminal B, audio terminal A is capable of speech communications, but is incapable of video and audio communications as well as only video reception.

Description will now be given on a signal flow that occurs in an operation of designating the video terminal by the audio terminal in the intercom system with the imaging function of the embodiment. While a user is making an audio response through the audio terminal to camera-equipped intercom slave 1, the user can designate the video terminal for displaying images taken by slave camera 11 of camera-equipped intercom slave 1. It is now assumed that the user designates video terminal E6 as the video terminal for displaying the images taken by slave camera 11. Home gateway 3 connects the video terminal designated through the audio terminal that is being used for responding to camera-equipped intercom slave I, and transmits the video signal that is transmitted from camera-equipped intercom slave 1 and is digitized by intercom adapter 2 to the connected video terminal. Through the above processing, designated video terminal E6 displays the images taken by slave camera 11 according to the video signal transmitted from camera-equipped intercom slave I while the speech communications are being performed between camera-equipped intercom slave 1 and the audio terminal. Thus, the speech communications through the camera-equipped intercom can be performed using audio terminal A (cordless telephone slave) and video terminal E6.

Figure 7A:
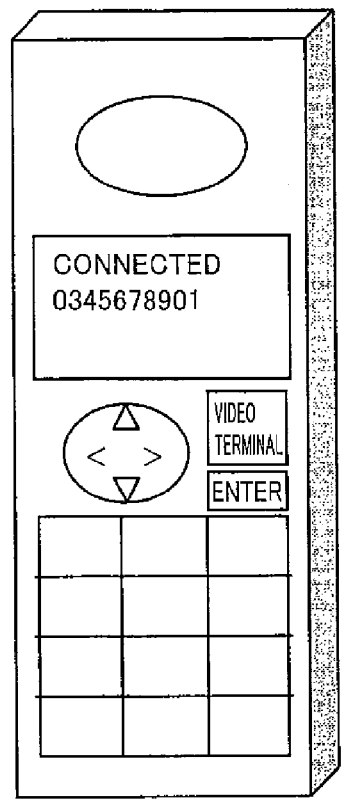
FIG. 7A shows an outer appearance of an audio terminal G (cellular phone) during speech communications, and particularly illustrates a video terminal designating operation in the embodiment.
Figure 7B:
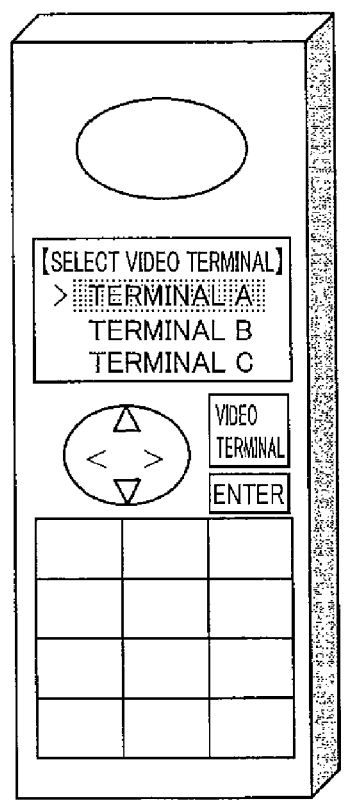
FIG. 7B shows an outer appearance of audio terminal G (cellular phone) during speech communications, and particularly illustrates the video terminal designating operation in the embodiment.

Description will now be given on an operation in which audio terminal G (cellular phone) is being used for the speech communications with camera-equipped intercom slave 1, and is also used for designating the video terminal for displaying the images taken by slave camera 11. FIG. 7A shows audio terminal G (cellular phone) that is being used. When a "'VIDEO TERMINAL" button is depressed during the speech communications, audio terminal G can display a list of the video terminals that can receive and display the video data as shown in FIG. 7B so that the video terminal can be selected with up and down keys or buttons. The video terminals displayed in the list form are the video terminals that are capable of "only video reception" in the "local terminal management table" in FIG. 6A, and the audio terminal having the function of designating the video terminal obtains the information form home gateway 3. In this example, audio terminal G obtains the information from home gateway 3 and displays it on audio terminal G.

When the user selects video terminal E6 and confirms it by operating the buttons, home gateway 3 is notified of selected (designated) video terminal E6. Home gateway 3 receives the notification from audio terminal G, connects the video path between intercom adapter 2 and video terminal E6, and transmits the video signal of the images taken by camera-equipped intercom slave 1 and received from intercom adapter 2 to video terminal E6. Through the above processing, audio terminal G and video terminal E6 can operate to perform the video intercom communications. Home gateway 3 registers audio and video terminals G and E6 in setting information storage 62 as the correlation information. This registration is performed as illustrated in the "terminal combination registration table" in FIG. 6B.

After the combination of the audio and video terminals is registered (stored) as the correlation information in setting information storage 62, home gateway 3 handles this combination such that this audio terminal has designated (selected) this video terminal, until this registration is changed or deleted. For example, when the combination of audio and video terminals G and E6 has been registered and audio terminal G responds to the call from camera-equipped intercom slave 1, home gateway 3 determines that video terminal E6 is designated, and video terminal E6 displays the image provided from camera-equipped intercom slave 1. When video terminal E6 is inconvenient for the user, the user can operate buttons on audio terminal G to select another video terminal.

When the user newly selects general-purpose device C (video output device) as the video terminal, home gateway 3 is notified of general-purpose device C as the newly selected (i.e., designated) video terminal. Home gateway 3 receiving the notification from audio terminal G connects the video path between intercom adapter 2 and newly selected (i.e., designated) general-purpose device C, and transmits the video signal produced by camera-equipped intercom slave 1 and transmitted from intercom adapter 2 to general-purpose device C. Through the above processing, audio terminal G and general-purpose device C can operate to perform the video intercom communications. Home gateway 3 deletes the combination of audio and video terminals G and E6 from the "terminal combination registration table", i.e., the correlation information in setting information storage 62, and newly registers the combination of audio terminal G and general-purpose device C.

As described above, home gateway 3 handles the video terminal registered in the terminal combination registration table as the video terminal selected and designated by the audio terminal in question. Therefore, in the case, e.g., where the audio terminal and the video terminal that are usually used are determined, it is possible to eliminate the process in which the audio terminal designates the video terminal every time the response is made to the call from camera-equipped intercom slave 1. For example, when the user usually uses audio terminal A (cordless telephone slave) in a living room for responding to the call from camera-equipped intercom slave 1, and usually views an image of a visitor on general-purpose device C (e.g., television receiver). However, the manner in which the video terminal is designated in response to every responding may be employed instead of the above manner of registering the combinations in the terminal combination registration table.

Audio terminal G (cellular phone) shown in FIGS. 7A and 7B is provided with the "VIDEO TERMINAL" and "ENTER" buttons, and therefore may be considered as a dedicated device rather than a general-purpose cellular phone. However, software for accepting special button inputs on the general-purpose cellular phone may be incorporated into home gateway 3 so that the general-purpose cellular phone can be used as audio terminal G. For example, these buttons are necessarily arranged on the general-purpose cellular phone independently of the manufacturers and types, and can be achieved by depressing them in an unusual manner or dialing a special number. For example, when "0" is consecutively dialed five times, the terminal enters the video terminal select mode, and displays the list of the video terminals on its display.

The "VIDEO TERMINAL" button in FIG. 7A is not essential, the designation may be performed as described below. When audio terminal G (cellular phone) with the display responds to the call from camera-equipped intercom slave 1, it displays on the display the speech communications information items such as "currently designated video terminal: E (television receiver)", "designate (new) video terminal" and "end communications" as will be described later in connection with a step S21 in FIG. 9. The user designates "designate (new) video terminal" by moving a cursor with forward and return buttons on the operation keypad, and fixes it by depressing the "ENTER" button. Since "designate (new) video terminal" is designated, the registered video terminals are displayed in the list form, and the user can designate the video terminal among them. The "ENTER" button in FIG. 7A is the same as those on ordinary cellular phones used for finally designating items on the display selected by moving forward and return buttons, and it is not necessary to arranged independently this button for the intercom system with the imaging function.

In the intercom system with the imaging function of the embodiment, home gateway 3 and each terminal can perform the communications over the wired or wireless LAN (Local Area Network), and both the video and audio signals are transmitted and received as the digital data. In this case, a call control protocol such as an SIP (Session Initiation Protocol) is generally used for the call processing, and protocols and digitizing algorithms such as H.323, MPEG (Moving Picture Expert Group) and G.711 are used for the transmission and reception of the video and audio signals. This embodiment is not restricted to these protocols and digitizing algorithms, and the processing described above can be achieved by separating the path connection for the audio signal from that for the video signal.

An example in which the SIP is used for the call processing will be briefly described below. For the sake of simplicity, only major massages among those of the SIP will be described. When intercom adapter 2 receives the call generation signal (analog signal) from camera-equipped intercom slave 1, intercom adapter 2 sends an INVITE (session establishment) request signal to home gateway 3 according to the SIP. When home gateway 3 receives the INVITE request signal from intercom adapter 2, it sends the INVITE request signal to the audio terminal capable of response (i.e., the terminal capable of speech communications) according to the "local terminal management table" in FIG. 6A. When the processing described above is performed, each audio terminal rings.

In a general IP (Internet Protocol) telephone (that uses, as its communications path, the telephone network constructed based on the IP base used in the Internet), when the user lifts the handset of the telephone on the receiver side, the receiver's telephone returns an OK response, which is a response to the INVITE signal provided from the caller's telephone, to the caller's telephone, and the caller's telephone returns an ACK request signal, which acknowledges the OK response signal sent from the receiver's telephone, to the receiver's telephone so that the communications session between the caller's and receiver's telephone is established.

According to the intercom system with the imaging function, however, an image of the visitor must be displayed on each registered video terminal before the user responds through the audio terminal to the call from camera-equipped intercom slave 1 as described before. Therefore, after the INVITE request signal is sent, intercom adapter 2 sends the video signal (RTP packet) of multicast to each video terminal without waiting for the OK response signal by the audio terminal. Each audio terminal rings, and each video terminal simultaneously displays the image. In the "local terminal management table" in FIG. 6A, the management numbers 3-5 indicate general-purpose device D (personal computer), video terminal E (video telephone) and video terminal F (video telephone), respectively, and thus indicate the terminals capable of audio and video communications, and each of these terminals is configured such that the audio terminal serves also as the video terminal. Therefore, these terminals display images simultaneously with ringing.

When the user responds through one of the audio terminals, the used audio terminal returns the OK response signal to home gateway 3, and home gateway 3 returns the OK response signal to intercom adapter 2. At this point in time, intercom adapter 2 stops the provision of the video signal of the multicast to each video terminal. Intercom adapter 2 establishes the session by returning the ACK request signal to the responded audio terminal for acknowledging the reception of the OK response signal provided from the responded audio terminal. Thereby, intercom adapter 2 starts the transmission and reception of the audio signal, and simultaneously starts to send the video signal only to the video terminal designated by the responded audio terminal. Through the above processing, the intercom communications become possible between camera-equipped intercom slave 1 and the audio terminal (video terminal).

Description will now be given on a flow in distinctive processing of the intercom system with the imaging function of the embodiment, and specifically, a flow in processing of home gateway 3 performed when a response is made to the call from camera-equipped intercom slave 1.

Figure 8:
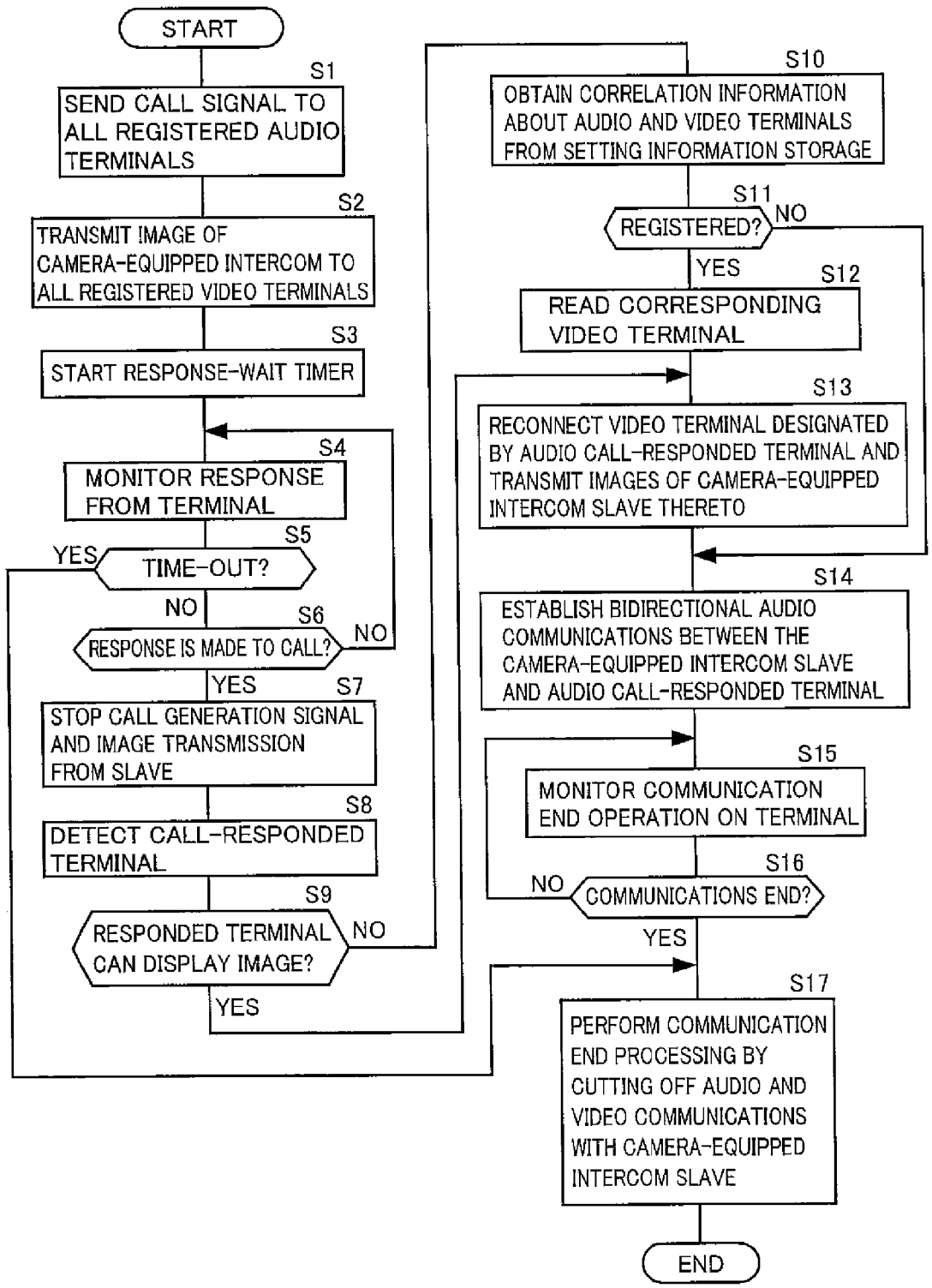
FIG. 8 is a flowchart of processing performed by the home gateway when a response is made to a call from the camera-equipped intercom slave in the embodiment.

FIG. 8 is a flowchart of processing performed when the response is made to the call. In FIG. 8, when camera-equipped intercom slave 1 makes a call, home gateway 3 sends the call generation signal to all the audio terminals registered in setting information storage 62 in a step S1. Specifically, according to the "local terminal management table" illustrated in FIG. 6A, the above audio terminals registered in setting information storage 62 are terminals that are capable of "audio communications" or "video and audio communications", and are audio terminal B (cordless telephone master), general-purpose device D (personal computer), video terminal E (video telephone) 6, video terminal F (video telephone) and audio terminal G (cellular phone). General-purpose device D (personal computer) can perform audio communications because it is equipped with a microphone. Since audio terminal A (cordless telephone slave) cannot be directly called from home gateway 3, and it is not registered. When a visitor depresses call switch 12 on camera-equipped intercom slave 1 to issue the call signal (call generation signal), slave camera 11 starts to take images. Then, the process proceeds to a step S2.

In step S2, the images taken by camera-equipped intercom slave 1 are transmitted to all the video terminals registered in setting information storage 62 for displaying them on the video terminals. Specifically, according to the "local terminal management table" illustrated in FIG. 6A, the above video terminals registered in setting information storage 62 are terminals that can perform "only video reception" or "video and audio communications", and are general-purpose device C (video output device), general-purpose device D (personal computer), video terminal E (video telephone) 6 and video terminal F (video telephone). Then, the process proceeds to a step S3, and system control unit 65 in home gateway 3 starts a response-wait timer. In a step S4, system control unit 65 monitors the operation to specify the terminal that made the response.

In a next step S5, the response-wait timer that started in step S3 determines whether a predetermined time has elapsed or not. When the predetermined time has elapsed, the response-wait timer is reset and stopped, and the process proceeds to a step S17. Otherwise, the process proceeds to a step S6. In step S6, it is determined whether any terminal having responded to the call or not, and the process proceeds to step S4 when no response was made. When the response was made, home gateway 3 stops the transmission of the call generation signal, and the process proceeds to a step S7. In step S7, system control unit 65 stops the transmission of the images provided from camera-equipped intercom slave 1 to all the video terminals. Since the response was made to the call, transmission of the call generation signal to the audio terminals is stopped.

Then, the process proceeds to step a step S8, and the terminal having responded to the call is detected. In a next step S9, it is determined whether the terminal having responded to the call is the video terminal capable of displaying the images or not. This video terminal is general-purpose device D (personal computer), video terminal E (video telephone) 6 or video terminal F (video telephone). When it is determined in step S9 that the terminal having responded to the call is the video terminal capable of image display, the process proceeds to a step S13. Otherwise, the process proceeds to a step S10. It is determined that the responded terminal is not the video terminal when audio terminal A (cordless telephone slave), audio terminal B (cordless telephone master) or audio terminal G (cellular phone) made the response.

In step S10, the correlation information about the audio and video terminals is obtained from the "terminal combination registration table" that is illustrated in FIG. 6B and is stored in setting information storage 62, and the process proceeds to a step S11. In step S11, system control unit 65 determines whether the correlation information relating to the audio terminal having responded to the call and the designated video terminal is registered in the obtained correlation information about the audio and video terminals or not. When the correlation information about the audio terminal in question is not registered, the process proceeds to a step S14. When the correlation information is registered, the process proceeds to a step S12. In step S12, the video terminal that is designated by the audio terminal having responded to the call is read from the correlation information about the audio terminal in question, and the process proceeds to step S13.

In step S13, the video terminal designated by the responded audio terminal (i.e., the video terminal read from the correlation information "terminal combination registration table" about the audio terminal in question) is set again to the state in which the data communications are allowed, and the image is sent from camera-equipped intercom slave 1 to the video terminal in question and is displayed thereby. When the audio terminal designates the video terminal, these audio and video terminals are registered as the correlation information in the "terminal combination registration table" stored in setting information storage 62. This registration is maintained until it is deleted or changed, although the registration can be freely deleted and changed, FIG. 6B illustrates an example of the "terminal combination registration table". The terminals such as the personal computer (with a microphone and a speaker) and the video telephones indicated by the management numbers 3-5 in the "local terminal management table" illustrated in FIG. 6A are capable of "video and audio communications". When the terminal among them responds to the call from camera-equipped intercom slave 1, it is usually assumed that the terminal uses its own video terminal. In the "terminal combination registration table" in FIG. 6B, therefore, the video terminal combination of each of the video terminals E and F as well as general-purpose device D indicated by the combination numbers 3, 4 and 5 is defaulted to its own video terminal. The process proceeds from step S13 to a step S14.

In step S14, the bidirectional audio communications are established between the responded audio terminal and camera-equipped intercom slave 1. This audio terminal may audio terminal A (cordless telephone slave), audio terminal B (cordless telephone master) or audio terminal G (cellular phone) and further may be video terminal E (video telephone) 6 or video terminal F (video telephone). In a next step SI 5, system control unit 65 monitors the operation to determine whether a call end operation is performed on the terminal. This terminal is basically the audio terminal that is operating for the speech communications. In a next step S16, system control unit 65 determines whether the call end operation is performed or not. When it is determined that the call end operation is performed, the process proceeds to step S17. Otherwise, the process returns to step S15. In next step S17, system control unit 65 cuts off all the video and audio communications with camera-equipped intercom slave 1, and performs the call end processing.

Description will now be given on a flow in the process performed by home gateway 3 when the user designates the video terminal through the currently operating audio terminal during the speech communications between the audio terminal and camera-equipped intercom slave 1, and thereby causes the designated video terminal to display images provided from camera-equipped intercom slave 1. After the start of the speech communications with the audio terminal, home gateway 3 performs the processing illustrated in a flowchart of FIG. 9. In the processing described below, the audio terminal is audio terminal G (cellular phone) or the like provided with the display.

Figure 9:
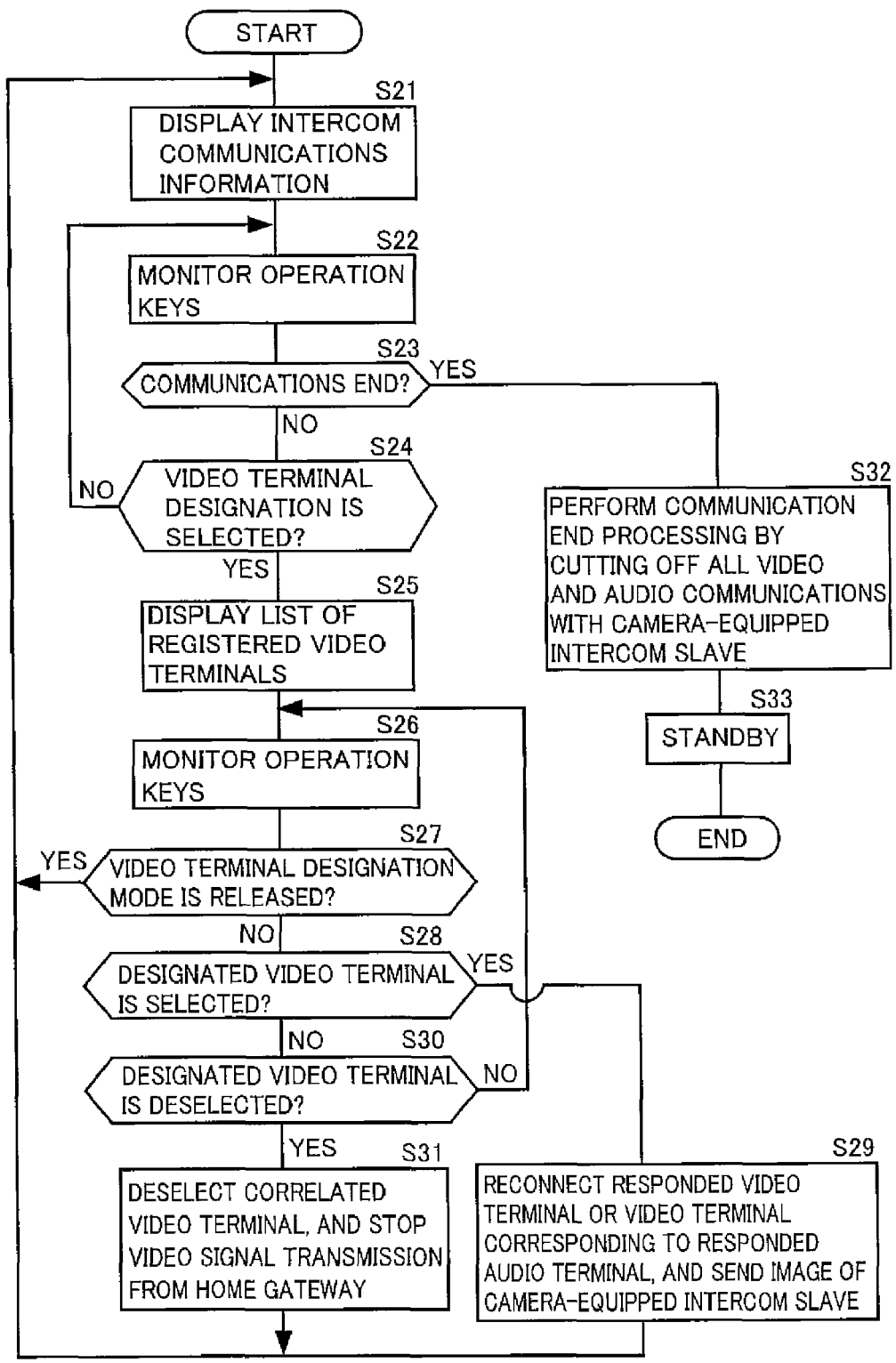
FIG. 9 is a flowchart of processing performed by the home gateway when a user designates the video terminal through the audio terminal that is being used for speech communications, and causes it to display an image provided from the camera-equipped intercom slave.

In FIG. 9, the display of the audio terminal displays the speech communications information in a step S21. The display of the speech communications information is performed for displaying, e.g., the information and state relating to the speech communications such as a slave number or a name (e.g., "ENTRANCE" or "BACKDOOR") that is assigned to the slave (when a plurality of camera-equipped intercom slaves 1 are connected) and "CURRENTLY DESIGNATED VIDEO TERMINAL: E (TV RECEIVER)". The display is also performed for assisting camera operations such as panning, tilting, zooming and the like, and for assisting function operations such as "DESIGNATION OF (NEW) VIDEO TERMINAL", "ENDING OF SPEECH COMMUNICATIONS". The user operates the forward and/or return buttons among the operation keys to move the cursor and designate the function, and then depresses the enter button to confirm the designation. When the designation of the video terminal is selected, the video terminals registered in setting information storage 62 ("local terminal management table" illustrated by way of example in FIG. 6A) are displayed in the list form, and the video terminal among them is designated by moving the cursor to the position of the intended video terminal for selection and depressing the enter button. The video terminals are displayed in the list form, and the user is merely required to select and designate the video terminal among them so that the user can easily designate the video terminal.

Further, "DESELECT VIDEO TERMINAL" (deselection of the designated video terminal) is present as a choice (see a step S30 in FIG. 9). When this choice is selected, the designation of the video terminal that is used in combination with the audio terminal is released, and the registered combination thereof is deleted from the correlation information "terminal combination registration table" of setting information storage 62. For example, the deselecting operation may be selected when television receiver operates as the designated video terminal and displays the images provided from camera-equipped intercom slave 1. In this case, transmission of the video signal from home gateway 3 stops, and the video display stops. The independent displayed item "END COMMUNICATIONS" may be eliminated, and the system can be configured to end the communications by hanging up the telephone receiver or pushing a "COMMUNICATIONS END" button. When the video terminal is not designated during the display of the above communications information, "CURRENTLY DESIGNATED VIDEO TERMINAL:) XXXX (blank)" is displayed. When the video terminals registered in setting information storage 62 ("local terminal management table" in FIG. 6A) are displayed in the list form, setting information storage 62 may have already store, as the correlation information, the video terminal that is already registered in the "terminal combination registration table" in FIG. 6B. In this case, the display terminal in the combination that is already registered may be displayed, e.g., in a framed, colored or inverted fashion for indicating that it is already registered.

Usually, slave camera 11 starts the imaging simultaneously with the operation of call switch 12 on camera-equipped intercom slave 1. When the communications end processing is performed to end the speech communications, slave camera 11 stops the imaging. However, slave camera 11 may be configured to start the imaging only after the audio terminal designates the video terminal, and to stop the imaging when the designation as the video terminal is released. Further, the system may be configured such that the audio terminal or the video terminal can be operated to control the start and stop of the imaging by slave camera 11, independently of the speech communications.

The combination of the designated video terminal and the audio terminal is registered as the correlation information in setting information storage 62. When the video terminal is not designated, the foregoing "XXXX" is blank. When it is designated, the designated video terminal is displayed, and camera-equipped intercom slave 1 sends the images to the designated video terminal. When "CURRENTLY DESIGNATED VIDEO TERMINAL: TELEVISION RECEIVER" is displayed and the television receiver operating as the video terminal is actually displaying the images provided from camera-equipped intercom slave 1, the video terminal designation may be further selected, and the new video terminal may be designated. In this case, the designation changes from the television receiver to the newly designated video terminal, and the newly designated video terminal displays the images provided from camera-equipped intercom slave 1. Naturally, the correlation information "terminal combination registration table" in setting information storage 62 changes. Thus, when the new video terminal is designated, the designation of the video terminal that has been registered in combination with the currently designated audio terminal is deleted, and the combination of the newly designated video terminal is registered. These control operations are processed by system control unit 65 of home gateway 3.

When audio terminal G (cellular phone) is used as the audio terminal for speech communications while using its own display as the designated video terminal, the display of the audio terminal can display the images taken by camera-equipped intercom slave 1. However, when the audio terminal is a cellular phone, it is impossible to perform the speech communications while using its own display as the video terminal and thereby displaying the images taken by camera-equipped intercom slave 1 on its own display because the user cannot view its display screen. In this case, therefore, the cellular phone used as the audio terminal cannot be designated as the video terminal. Accordingly, audio terminal G (cellular phone) described at management number 6 in the "local terminal management table" illustrated in FIG. 6A is capable of "speech communications", but is incapable of "video and audio communications" and "only video reception". When the audio terminal is the video telephone, it can be effectively designated also as the video terminal. The user may designate another video terminal through the audio terminal that is operating for the speech communications. In this case, the operation keys on the audio terminal are operated to display the foregoing communications information and thereby to designate the video terminal.

In a next step S22, system control unit 65 determines whether the user operated the operation key on the currently operating audio terminal or not. In a step S23, it is determined whether the operation detected in step S22 is the communication end operation performed by the currently operating audio terminal or not. When the communication end operation is performed, the process proceeds to a step S32, in which the operation is performed to end the current communications of the audio and video terminals with the camera-equipped intercom slave. When it is not determined that the operation detected in step S22 is the communication end operation, the process proceeds to a step S24, in which it is determined whether the operation detected in step S22 is the selection operation for designating the video terminal by the currently operating audio terminal or not. When the operation is for selecting the video terminal designation, the process proceeds to a step S25. When it is not determined that the operation for selecting the video terminal designation is performed, the process returns to step S22. In step S25, the display of the currently operating audio terminal displays a list of the video terminals registered in setting information storage 62, i.e., the video terminals that are capable of "video and audio communications" or "only video reception" according to the "local terminal management table" in FIG. 6A. In a next step S26, system control unit 65 monitors the input operation of the operation keys on the audio terminal.

When the operation detected in step S26 is performed on a release key for releasing the video terminal designation mode, system control unit 65 determines in step S27 that the operation was performed for releasing the mode of the video terminal designation, ends the mode of designating the video terminal, returns to step S21 and redisplays the intercom communications information.

When the operation detected in step S26 is not performed through the release key for releasing the video terminal designation mode, the process proceeds to a step S28, in which it is determined whether the operation is performed for selecting the video terminal to be designated or not. When the operation is performed for selecting the video terminal to be designated, the process proceeds to a step S29. Otherwise, the process proceeds to step S30. In step S29, the video terminal designated by the currently operating audio terminal is set to the state for communications, and the images taken by camera-equipped intercom slave 1 is sent to it and is displayed thereon. The combination of the currently operating audio terminal and the designated video terminal is registered in the "terminal combination registration table". Then, the process returns to step S22.

In step S30, it is determined whether the operation is performed for deselecting the video slave (i.e., releasing the selection of the designated video terminal) or not. When it is determined that the operation is performed for deselecting the video slave, the process proceeds to a step S31. Otherwise, the operation returns to step S26. In step S31, system control unit 65 deselects the video terminal registered in the "terminal combination registration table", and stops the transmission of the video signal to the deselected video terminal from home gateway 3.

In step S32, system control unit 65 cuts off all the video and audio communications with camera-equipped intercom slave 1, and the communication end processing is performed. In a step S33, system control unit 65 sets the intercom system with the imaging function to a standby state.

Figure 10:
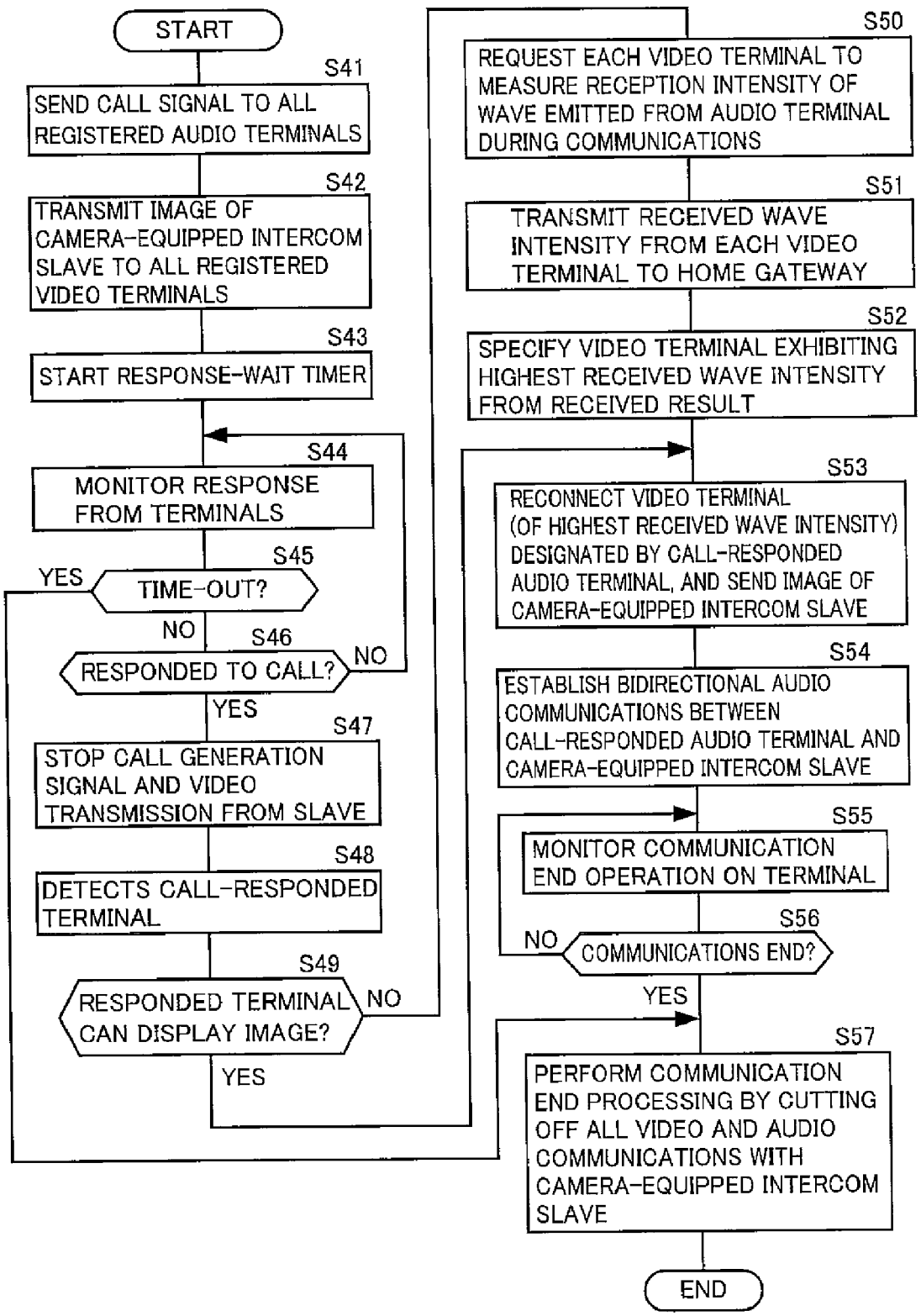
FIG. 10 is a flowchart of processing of the home gateway regarding the video terminal exhibiting the highest reception intensity of a radio wave emitted from the audio terminal having responded to the call as the nearest video terminal, and causing the nearest video terminal to display the image provided from the camera-equipped intercom slave.

When the user responded through the audio terminal to the call, it is convenient to designate the nearest video terminal. For designating the nearby video terminal, an intensity of a radio wave emitted from the currently operating audio terminal can be measured at each video terminal receiving it. FIG. 10 illustrates a flowchart of processing, in which home gateway 3 automatically retrieves the video terminal exhibiting the highest intensity of the received wave, designates the video terminal exhibiting the highest intensity of the received wave and causes the designated video terminal to display the images provided from camera-equipped intercom slave 1. Processing in steps S41-S49 are the same as that in steps S1-S9 in FIG. 8, and processing in steps S53-S57 is the same as that in steps S13-S17 in FIG. 8. Therefore, the processing in these steps will be described only briefly. The processing of automatically retrieving the video terminal receiving the wave with the highest intensity and designating it as the video terminal is performed in steps S50-S52.

Audio terminal G (cellular phone) always performs the communications with the base station at predetermined time intervals, and therefore is always emitting a radio wave. Naturally, it emits the radio wave during the speech communications. Although audio terminal A (cordless telephone slave) is an analog telephone, it always emits a radio wave for communications with audio terminal B (cordless telephone master) during the speech communications. Video terminals E6 and F are video telephones that perform the communications over the wireless LAN, and therefore always emit radio waves during the speech communications. As described above, the audio terminal having responded to the call is always emitting the radio waves.

The video terminals of which received wave intensities are determined can be considered as follows. Video terminals E6 and F are the video telephones that perform the communications over the wireless LAN, and therefore can naturally receive the radio wave. General-purpose device D (personal computer) may perform the communications over the wireless LAN depending on its structure.

In FIG. 10, when camera-equipped intercom slave I performs the calling, home gateway 3 sends the call generation signal to all the audio terminals registered in setting information storage 62. In next step S42, the video signal provided from camera-equipped intercom slave 1 is transmitted to all the video terminals registered in setting information storage 62 for displaying it on each video terminal. In next step S43, home gateway 3 causes system control unit 65 to start the response-wait timer. In step S44, system control unit 65 determines whether any one of the terminals has responded to the call.

In next step S45, it is determined whether the wait-response timer started in step S43 has counted to a predetermined time or not. When the response-wait timer has counted to the predetermined time, it is reset to stop the counting, and the process proceeds to a step S57. Otherwise, the process proceeds to step S46. In step S46, it is determined whether any one of the terminals responded to the call or not, and the process returns to step S44 when the response was not performed. When the response was performed, the process proceeds to step S47. In step S47, system control unit 65 stops the transmission of the images provided from camera-equipped intercom slave 1 to all the video terminals. Also, it stops emission of the call generation signal. In next step S48, the terminal having responded to the call is detected. In next step S49, it is determined whether the terminal having responded to the call is one of the video terminals capable of displaying images or not. The video terminals in this case include general-purpose device D (personal computer), video terminal E (video telephone) 6 and video terminal F (video telephone). When it is determined in step S49 that the terminal having responded to the call is the video terminal capable of displaying images, the process proceeds to step S53. Otherwise, the process proceeds to step S50. Specifically, it is determined that the terminal having responded to the call is not the video terminal when this terminal having responded to the call is, e.g., audio terminal A (cordless telephone slave), audio terminal B (cordless telephone master) or audio terminal G (cellular phone) that is incapable of "video and audio communications" according to the "local terminal management table" in FIG. 6A.

In step S50, the processing is performed on the video terminals that are registered in setting information storage 62 (i.e., are capable of "video and audio communications" or "only video reception" according to the "local terminal management table" in FIG. 6A) and can perform the wireless communications through radio waves with home gateway 3, and these video terminals are instructed to measure the received wave intensities of the waves emitted from the currently operating audio terminal, and to report the result of the measurement to home gateway 3. Even when the video terminal used in this step is a general-purpose device, it is necessary that the terminal can measure the received wave intensity, and can report the measurement result in response to the measurement request instruction. It is understood that the video terminal exhibiting the high received wave intensity is located near the audio terminal. System control unit 65 of home gateway 3 receives a measurement result report about the received wave intensity from each video terminal, and determines a relative distance from each video terminal to the currently operating audio terminal.

In step S51, the measurement result of the received wave intensity of each video terminal is transmitted to home gateway 3, and the process proceeds to step S52. In step S52, home gateway 3 specifies the video terminal exhibiting the highest received wave intensity among those exhibiting the received wave intensities. The video terminal exhibiting the highest received wave intensity is handled as the video terminal that is selected by the audio terminal having responded to the call from camera-equipped intercom slave 1. The combination of them is registered in the "terminal combination registration table", and the process proceeds to step S53. In step S53, the communications are allowed again with respect to the video terminal that is designated by the audio terminal having responded to the call (and exhibiting the highest received wave intensity), and the video signal provided from camera-equipped intercom slave 1 is sent to this video terminal for displaying the images. When the designated video terminal is inconvenient for the user, the user can operate the operation keys to change the video terminal to be designated. Then, the process proceeds to step S54.

In step S54, the audio communications are established between the responded audio terminal and camera-equipped intercom slave 1. In next step S55, system control unit 65 monitors the operation to detect the communication end operation that may be performed on the terminal. In next step S56, system control unit 65 determines whether the communication end operation is performed or not. When it is determined that the communication end operation is performed, the process proceeds to step S57. Otherwise, the process returns to step S55. In next step S57, system control unit 65 performs the communication end processing by cutting off all the video and audio communications with camera-equipped intercom slave 1.

[Conclusion]

Finally, the descriptions in the claims are written together with the descriptions relating to the embodiment and disclosure grounds written in a parenthesized form for confirming that the contents in the claims are supported by the embodiment and for clarifying the interpretation of the claims.

(1) The intercom system with an imaging function (see FIG. 1) comprising:

an intercom slave (camera-equipped intercom slave 1) having imaging means (slave camera 11), audio input means (slave microphone (audio input unit) 13), audio output means (slave speaker (audio output unit) 14) and calling means (call switch 12) for issuing a call signal;

a home gateway device (home gateway 3; The gateway is a device that allows communications by mutually converting data items of different mediums or protocols on the network, and allows the connection between different kinds of devices or the like by absorbing the difference in communication medium and transmission method.") controlling communications connection between devices (audio terminal B, general-purpose devices C and D, intercom adapter 2 connected to LAN cable 4 in FIG. 1 as well as audio terminal G, video terminal E6 and video terminal F capable of wireless communications) capable of wired or wireless communications over a local area network;

an intercom adapter connected to the intercom slave (see FIG. 3, "camera-equipped intercom interfaces 21A (I/F-A) and 21B (I/F-B) that are interfaces with respect to two-wire cables 5A and 5B connected to two camera-equipped intercom slaves 1A and 1B, respectively"), and having signal converting means for converting an analog signal provided from the intercom slave into a digital signal transmittable to the local area network side, and converting a signal transmitted from the local area network side into a signal receivable by the intercom slave ("video data compression processing unit 24 that performs digital conversion on the separated video analog signal, and audio data compression/expansion processing unit 25 that performs digital conversion on the separated audio data and performs analog conversion on the digital audio signal sent through LAN cable 4 (see FIG. 1)");

an audio terminal (e.g., audio terminal B (cordless telephone master, see FIG. 1) being capable of transmission and reception with respect to the home gateway device ("When a user performs a responding operation on one of the audio terminals in response to the notification by the call generation signal, intercom adapter 2 connects the audio communications path to home gateway 3, which connects the audio communications path to the responded audio terminal", "When system control unit 81 receives the video signal provided from imaging unit (camera) 71, it transmits the video signal to video data compression/expansion processing unit 75 for compressing and digitizing it, and then transmits the digital video signal through LAN communication control unit 77 and wireless LAN interface 78 to home gateway 3. . . . Although the structure of the audio terminal and its signal flow are not shown, these are substantially the same as those of the video terminal in FIG. 5"), and having call responding means for responding to a call signal provided from the intercom slave ("When a cordless telephone is an analog telephone, its master (audio terminal B) can be connected to analog telephone control unit 63 so that the user can respond to the call from camera-equipped intercom slave 1 and can perform speech communications through a slave (audio terminal A) of the cordless telephone.", "an operation unit (keys, buttons and the like) 79 for responding to the call generation signal transmitted from camera-equipped intercom slave 1 and for making and taking calls"), and means for audio communications with the intercom slave (e.g., audio terminal B (cordless telephone master) in FIG. 1, "The audio terminals that can perform the speech communications with camera-equipped intercom slave 1 through wired LAN interface 60", "The audio terminal that can perform the speech communications with camera-equipped intercom slave 1 through wireless control unit 38 and wireless LAN interface 39"); and a video terminal (e.g., video terminal E (video telephone), see FIG. 5) capable of transmission and reception with respect to the home gateway device ("Video terminals E and F are, e.g., video telephones, and can perform wireless communications through home gateway 3.", "In FIG. 5, since video terminal E6 that is the video telephone connected to home gateway 3 over the wireless LAN is employed, only wireless LAN interface 78 connected to LAN communication control unit 77 is shown. However, a wired LAN interface is also employed for allowing communications with home gateway 3 through LAN cable 4. This structure is similarly employed also in the case where the video terminal is connected over the wired LAN.". "When system control unit 81 receives the video signal provided from imaging unit (camera) 71, it transmits the video signal to video data compression/expansion processing unit 75 for compressing and digitizing it, and then transmits the digital video signal through LAN communication control unit 77 and wireless LAN interface 78 to home gateway 3.", "the analog video signal of the image provided from slave camera (imaging unit) 11 of camera-equipped intercom slave 1 is transmitted to intercom adapter 2. Video data compression processing unit 24 in intercom adapter 2 compresses the analog video signal into a digital form. The digitized video signal is transmitted to home gateway 3, and further is transmitted to the video terminals."), and having image display means for receiving a video signal from the intercom slave, and displaying an image based on the received video signal ("Home gateway 3 transmits the video signal to the terminal(s) which are determined as the terminals capable of "video and audio communications" according to the local terminal management table illustrated in FIG. 6A, and thereby causes the terminals to display an image of a visitor."), wherein the audio terminal has video terminal selecting means for selecting or deselecting the video terminal (S28 in FIG. 9, "When the audio terminal designates the video terminal, these audio and video terminals are registered as the correlation information in the "terminal combination registration table" stored in setting information storage 62 This registration is maintained until it is deleted or changed, although the registration can be freely deleted and changed."), the home gateway device has terminal registering means for registering the audio terminal and the video terminal capable of communications with the intercom slave (1) ("a "local terminal management table" in FIG. 6A that is information about terminals registered in the camera-equipped intercom system"), when the intercom slave issues the call signal, the home gateway device transmits the call signal to the audio terminal registered in the terminal registering means (S in FIG. 8), and transmits the video signal provided from the intercom slave having issued the call signal to the video terminal registered in the terminal registering means (S2 in FIG. 8), and when one of the audio terminals receiving the call signal responds to the call signal (YES in S6 in FIG. 8), the home gateway device stops transmission of the call signal ("When the response was made, home gateway 3 stops the transmission of the call generation signal") and transmission of the video signal provided from the intercom slave having issued the call signal to the video terminal registered in the terminal registering means (S7 in FIG. 8), performs control to allow bidirectional communications between the audio terminal having responded to the call signal and the intercom slave having issued the call signal (S14 in FIG. 8), performs control to allow communications between the video terminal selected by the video terminal selecting means of the audio terminal having responded to the call signal and the intercom slave having issued the call signal (S13 in FIG. 8), and causes the video terminal selected by the audio terminal to display the image based on the video signal provided from the intercom slave having issued the call signal ("In step S13, the responded video terminal or the video terminal designated by the responded audio terminal (i.e., the video terminal read from the correlation information about the audio terminal in question) is set again to the state in which the data communications are allowed, and the image is sent from camera-equipped intercom slave 1 to the video terminal in question and is displayed thereby.").

(2) The intercom system with the imaging function according to (1), wherein the terminal registering means registers a combination of the video terminal selected according to a selection instruction of the video terminal selecting means and the audio terminal performing the selection instruction in a terminal combination registration table ("When the audio terminal designates the video terminal, these audio and video terminals are registered as the correlation information in the "terminal combination registration table" stored in setting information storage 62. This registration is maintained until it is deleted or changed, although the registration can be freely deleted and changed.", see the "terminal combination registration table" in FIG. 6), the terminal registering means deletes the video terminal deselected according to a deselection instruction of the video terminal selecting means and the audio terminal instructing the deselection from the terminal combination registration table (the "terminal combination registration table" in FIG. 6) ("When this choice is selected, the designation of the video terminal that is used in combination with the audio terminal is released, and the registered combination thereof is deleted from the correlation information "terminal combination registration table" of setting information storage 61", S27 in FIG. 9), and the home gateway device handles the video terminal registered in the combined fashion together with the audio terminal instructing the selection in the terminal combination registration table as the video terminal selected by the video terminal selecting means of the audio terminal instructing the selection, performs control to allow communications between the video terminal and the intercom slave having issued the call signal, and causes the video terminal to display the image based on the video signal provided from the intercom slave having issued the call signal ("In step S10, the correlation information about the audio and video terminals is obtained from the "terminal combination registration table" that is illustrated in FIG. 6B and is stored in setting information storage 62, and the process proceeds to a step S11. In step S11, system control unit 65 determines whether the correlation information relating to the audio terminal having responded to the call and the designated video terminal is registered in the obtained correlation information about the audio and video terminals or not. When the correlation information about the audio terminal in question is not registered, the process proceeds to a step S14 When the correlation information is registered, the process proceeds to a step S12. In step S12, the video terminal that is designated by the audio terminal having responded to the call is read from the correlation information about the audio terminal in question, and the process proceeds to step S13. In step S13, the video terminal designated by the responded audio terminal (i.e., the video terminal read from the correlation information "terminal combination registration table" about the audio terminal in question) is set again to the state in which the data communications are allowed, and the image is sent from camera-equipped intercom slave 1 to the video terminal in question and is displayed thereby.").

(3) The intercom system with the imaging function according to (1), wherein the audio terminal further includes display means ("audio terminal G (cellular phone)", see FIGS. 7A and 7B, the display means displays a list of the video terminals registered as the video terminals in the terminal registering means ("In step S25, the display of the currently operating audio terminal displays a list of the video terminals registered in setting information storage 62, i.e., the video terminals that are capable of "video and audio communications" or "only video reception" according to the "local terminal management table" in FIG. 6A.") when the audio terminal having responded to the call signal selects the video terminal by the video terminal selecting means (YES in S24 in FIG. 9), and the video terminal is selected by a user from the list of the video terminals displayed by the display means (YES in S28 in FIG. 9).

(4) The intercom system with the imaging function according to (1), wherein the video terminal registered in the terminal registering means and being capable of receiving a radio wave ("In step S50, the video terminals that are registered in setting information storage 62 (i.e., are capable of "video and audio communications" or "only video reception" according to the "local terminal management table" in FIG. 6A) and can perform the wireless communications through radio waves with home gateway 3.") further includes:

received wave intensity determining means for determining a reception intensity of each of the video terminals receiving the radio wave emitted from the audio terminal having responded to the call signal (S50 in FIG. 10, "In step S50, the processing is performed on the video terminals that are registered in setting information storage 62 (i.e., are capable of "video and audio communications" or "only video reception" according to the "local terminal management table" in FIG. 6A) and can perform the wireless communications through radio waves with home gateway 3, and these video terminals are instructed to measure the received wave intensities of the waves emitted from the currently operating audio terminal, and to report the result of the measurement to home gateway 3."), and received wave intensity reporting means (S51 in FIG. 50) for reporting the received wave intensity determined by the received wave intensity determining means to the home gateway device (the processing is performed on the video terminals that are registered in setting information storage 62 and can perform the wireless communications through radio waves with home gateway 3, and these video terminals are instructed to measure the received wave intensities of the waves emitted from the currently operating audio terminal, and to report the result of the measurement to home gateway 3."); and when one of the audio terminals responds to the call signal provided from the intercom slave (YES in S46 in FIG. 10), the home gateway device requests each of the video terminals including the received wave intensity reporting means to provide a report about the received wave intensity determined by the received wave intensity determining means (S50 in FIG. 10), and the home gateway device handles the video terminal (S52 in FIG. 10) exhibiting the highest received wave intensity among the video terminals providing the reports as the video terminal selected by the video terminal selecting means of the audio terminal having responded to the call signal ("The video terminal exhibiting the highest received wave intensity is handled as the video terminal that is selected by the audio terminal having responded to the call from camera-equipped intercom slave 1.", performs control to allow communications between the video terminal and the intercom having issued the call signal, and causes the video terminal to display the image based on the video signal provided from the intercom slave having issued the call signal (S53 in FIG. 10).

(5) The audio terminal forming the intercom system with the imaging function according to any one of (1)-(4), wherein the audio terminal includes the video terminal selecting means.

(6) The home gateway device (3) forming the intercom system with the imaging function according to any one of (1)-(4), wherein the home gateway device has the terminal registering means, when the intercom slave issues the call signal, the home gateway device transmits the call signal to the audio terminal registered in the terminal registering means (S1 in FIG. 8), and transmits the video signal provided from the intercom slave having issued the call signal to the video terminal registered in the terminal registering means (S2 in FIG. 8), and when one of the audio terminals receiving the call signal responds to the call signal (YES in S6 in FIG. 8), the home gateway device stops transmission of the call signal and transmission of the video signal provided from the intercom slave having issued the call signal to the video terminal registered in the terminal registering means (S7 in FIG. 8), performs control to allow bidirectional communications between the audio terminal having responded to the call signal and the intercom slave having issued the call signal (S14 in FIG. 8), performs control to allow communications between the video terminal selected by the video terminal selecting means of the audio terminal having responded to the call signal and the intercom slave having issued the call signal, and causes the video terminal selected by the audio terminal to display the image based on the video signal provided from the intercom slave having issued the call signal (S13 in FIG. 8, "In step S13, the video terminal designated by the responded audio terminal (i.e., the video terminal read from the correlation information "terminal combination registration table" about the audio terminal in question) is set again to the state in which the data communications are allowed, and the image is sent from camera-equipped intercom slave 1 to the video terminal in question and is displayed thereby.").

(7) The intercom adapter (2) forming the intercom system with the imaging function according to any one of (1)-(4), wherein the intercom adapter is connected to the intercom slave, and comprises the signal converting means, (8) The video terminal forming the intercom system with the imaging function according to any one of (1)-(4), wherein the video terminal is registered as the video terminal in the terminal registering means of the home gateway device ("the video terminals registered in setting information storage 62, i.e., the video terminals that are capable of "video and audio communications" or "only video reception" according to the "local terminal management table" in FIG. 6A.");

the video terminal further comprises:

wave receiving means for allowing reception of a radio wave ("Video terminals E6 and F are the video telephones that perform the communications over the wireless LAN, and therefore can naturally receive the radio wave. General-purpose device D (personal computer) may perform the communications over the wireless LAN depending on its structure."), received wave intensity determining means for determining a reception intensity of the wave emitted from the audio terminal having responded to the call signal (S50 in FIG. 10. "In step S50, the processing is performed on the video terminals that are registered in setting information storage 62 (i.e., are capable of "video and audio communications" or "only video reception" according to the "local terminal management table" in FIG. 6A) and can perform the wireless communications through radio waves with home gateway 3, and these video terminals are instructed to measure the received wave intensities of the waves emitted from the currently operating audio terminal, and to report the result of the measurement to home gateway 3."), and received wave intensity reporting means (S51 in FIG. 10) for reporting the received wave intensity determined by the received wave intensity determining means to the home gateway device; and when one of the audio terminals responds to the call signal provided from the intercom slave (YES in S46 in FIG. 10), and the home gateway device requests reporting of the received wave intensity (S50 in FIG. 10), the received wave intensity reporting means transmits a result of the reception intensity determination performed by the received wave intensity determining means (S51 in FIG. 10).

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The intercom system with the imaging function according to the invention can be user-friendly. For example, the user can respond to the call of the visitor through the nearby audio terminal while checking the visitor of which image is taken by the intercom slave and displayed on the nearby video terminal. When the user responds through the audio terminal to the call provided from intercom slave, the image taken by the intercom slave is displayed on the designated video terminal An appropriate one(s) of the general-purpose devices already arranged in the home of the resident may be used.

The invention claimed is:

1. An intercom system with an imaging function comprising:

an intercom slave having imaging means, audio input means, audio output means and calling means for issuing a call signal;

a home gateway device controlling communications connection between devices capable of wired or wireless communications over a local area network;

an intercom adapter connected to said intercom slave, and having signal converting means for converting an analog signal provided from said intercom slave into a digital signal transmittable to said local area network side, and converting a signal transmitted from said local area network side into a signal receivable by said intercom slave;

an audio terminal being capable of transmission and reception with respect to said home gateway device, and having call responding means for responding to a call signal provided from said intercom slave, and means for audio communications with said intercom slave; and a video terminal capable of transmission and reception with respect to said home gateway device, and having image display means for receiving a video signal from said intercom slave, and displaying an image based on the received video signal, wherein said audio terminal has video terminal selecting means for selecting or deselecting said video terminal, said home gateway device has terminal registering means for registering the audio terminal and the video terminal capable of communications with said intercom slave, when said intercom slave issues the call signal, said home gateway device transmits the call signal to the audio terminal registered in said terminal registering means, and transmits the video signal provided from the intercom slave having issued said call signal to the video terminal registered in said terminal registering means, and when one of said audio terminals receiving said call signal responds to said call signal, said home gateway device stops transmission of said call signal and transmission of the video signal provided from the intercom slave having issued said call signal to the video terminal registered in said terminal registering means, performs control to allow bidirectional communications between the audio terminal having responded to said call signal and the intercom slave having issued said call signal, performs control to allow communications between the video terminal selected by said video terminal selecting means of said audio terminal having responded to said call signal and the intercom slave having issued said call signal, and causes the video terminal selected by said audio terminal to display the image based on the video signal provided from the intercom slave having issued said call signal, wherein the video terminal registered in said terminal registering means and being capable of receiving a radio wave further includes:

received wave intensity determining means for determining a reception intensity of each of the video terminals receiving the radio wave emitted from the audio terminal having responded to said call signal, and received wave intensity reporting means for reporting the received wave intensity determined by said received wave intensity determining means to said home gateway device; and when one of said audio terminals responds to the call signal provided from said intercom slave, said home gateway device requests each of the video terminals including said received wave intensity reporting means to provide a report about the received wave intensity determined by said received wave intensity determining means, and said home gateway device handles the video terminal exhibiting the highest received wave intensity among the video terminals providing the reports as the video terminal selected by said video terminal selecting means of the audio terminal having responded to said call signal, performs control to allow communications between said video terminal and the intercom having issued said call signal, and causes the video terminal to display the image based on the video signal provided from the intercom slave having issued said call signal.

2. An intercom system with an imaging function comprising:
an intercom slave having imaging means, audio input means, audio output means and calling means for issuing a call signal;
a home gateway device controlling communications connection between devices capable of wired or wireless communications over a local area network;
an intercom adapter connected to said intercom slave, and having signal converting means for converting an analog signal provided from said intercom slave into a digital signal transmittable to said local area network side, and converting a signal transmitted from said local area network side into a signal receivable by said intercom slave;
an audio terminal being capable of transmission and reception with respect to said home gateway device, and having call responding means for responding to a call signal provided from said intercom slave, and means for audio communications with said intercom slave; and
a video terminal capable of transmission and reception with respect to said home gateway device, and having image display means for receiving a video signal from said intercom slave, and displaying an image based on the received video signal, wherein
said audio terminal has video terminal selecting means for selecting or deselecting said video terminal,
said home gateway device has terminal registering means for registering the audio terminal and the video terminal capable of communications with said intercom slave,
when said intercom slave issues the call signal, said home gateway device transmits the call signal to the audio terminal registered in said terminal registering means, and transmits the video signal provided from the intercom slave having issued said call signal to the video terminal registered in said terminal registering means, and
when one of said audio terminals receiving said call signal responds to said call signal, said home gateway device stops transmission of said call signal and transmission of the video signal provided from the intercom slave having issued said call signal to the video terminal registered in said terminal registering means, performs control to allow bidirectional communications between the audio terminal having responded to said call signal and the intercom slave having issued said call signal, performs control to allow communications between the video terminal selected by said video terminal selecting means of said audio terminal having responded to said call signal and the intercom slave having issued said call signal, and causes the video terminal selected by said audio terminal to display the image based on the video signal provided from the intercom slave having issued said call signal, wherein
said video terminal is registered as the video terminal in said terminal registering means of said home gateway device;

said video terminal further comprises:
wave receiving means allowing reception of a radio wave,
received wave intensity determining means for determining a reception intensity of the wave emitted from the audio terminal having responded to said call signal, and
received wave intensity reporting means for reporting the received wave intensity determined by said received wave intensity determining means to said home gateway device; and
when one of said audio terminals responds to the call signal provided from said intercom slave, and said home gateway device requests reporting of the received wave intensity, said received wave intensity reporting means transmits a result of the reception intensity determination performed by said received wave intensity determining means.

3. The video terminal according to claim 2, wherein
said terminal registering means registers a combination of the video terminal selected according to a selection instruction of said video terminal selecting means and the audio terminal performing said selection instruction in a terminal combination registration table,
said terminal registering means deletes the video terminal deselected according to a deselection instruction of said video terminal selecting means and the audio terminal instructing the deselection from said terminal combination registration table, and
said home gateway device handles the video terminal registered in the combined fashion together with said audio terminal instructing said selection in said terminal combination registration table as the video terminal selected by the video terminal selecting means of said audio terminal instructing said selection, performs control to allow communications between said video terminal and the intercom slave having issued said call signal, and causes said video terminal to display the image based on the video signal provided from the intercom slave having issued said call signal.

4. The video terminal according to claim 2, wherein
said audio terminal further includes display means,
said display means displays a list of the video terminals registered as said video terminals in said terminal registering means when the audio terminal having responded to said call signal selects said video terminal by said video terminal selecting means, and
said video terminal is selected by a user from the list of the video terminals displayed by said display means.

5. The video terminal according to claim 2, wherein the video terminal registered in said terminal registering means and being capable of receiving a radio wave further includes:
received wave intensity determining means for determining a reception intensity of each of the video terminals receiving the radio wave emitted from the audio terminal having responded to said call signal, and
received wave intensity reporting means for reporting the received wave intensity determined by said received wave intensity determining means to said home gateway device; and
when one of said audio terminals responds to the call signal provided from said intercom slave,
said home gateway device requests each of the video terminals including said received wave intensity reporting means to provide a report about the received wave intensity determined by said received wave intensity determining means, and
said home gateway device handles the video terminal exhibiting the highest received wave intensity among the video terminals providing the reports as the video terminal selected by said video terminal selecting means of the audio terminal having responded to said call signal, performs control to allow communications between said video terminal and the intercom having issued said call signal, and causes the video terminal to display the image based on the video signal provided from the intercom slave having issued said call signal.

6. An intercom system with an imaging function comprising:
   an intercom slave having imaging means, audio input means, audio output means and calling means for issuing a call signal;
   a home gateway device controlling communications connection between devices capable of wired or wireless communications over a local area network;
   an intercom adapter connected to said intercom slave, and having signal converting means for converting an analog signal provided from said intercom slave into a digital signal transmittable to said local area network side, and converting a signal transmitted from said local area network side into a signal receivable by said intercom slave;
   an audio terminal being capable of transmission and reception with respect to said home gateway device, and having call responding means for responding to a call signal provided from said intercom slave, and means for audio communications with said intercom slave; and
   a video terminal capable of transmission and reception with respect to said home gateway device, and having image display means for receiving a video signal from said intercom slave, and displaying an image based on the received video signal, wherein
   said audio terminal has video terminal selecting means for selecting or deselecting said video terminal,
   said home gateway device has terminal registering means for registering the audio terminal and the video terminal capable of communications with said intercom slave,
   when said intercom slave issues the call signal, said home gateway device transmits the call signal to the audio terminal registered in said terminal registering means, and transmits the video signal provided from the intercom slave having issued said call signal to the video terminal registered in said terminal registering means, and
   when one of said audio terminals receiving said call signal responds to said call signal, said home gateway device stops transmission of said call signal and transmission of the video signal provided from the intercom slave having issued said call signal to the video terminal registered in said terminal registering means, performs control to allow bidirectional communications between the audio terminal having responded to said call signal and the intercom slave having issued said call signal, performs control to allow communications between the video terminal selected by said video terminal selecting means of said audio terminal having responded to said call signal and the intercom slave having issued said call signal, and causes the video terminal selected by said audio terminal to display the image based on the video signal provided from the intercom slave having issued said call signal, wherein
   said audio terminal comprises said video terminal selecting means, wherein
   the video terminal registered in said terminal registering means and being capable of receiving a radio wave further includes:
   received wave intensity determining means for determining a reception intensity of each of the video terminals receiving the radio wave emitted from the audio terminal having responded to said call signal, and
   received wave intensity reporting means for reporting the received wave intensity determined by said received wave intensity determining means to said home gateway device; and
   when one of said audio terminals responds to the call signal provided from said intercom slave,
   said home gateway device requests each of the video terminals including said received wave intensity reporting means to provide a report about the received wave intensity determined by said received wave intensity determining means, and
   said home gateway device handles the video terminal exhibiting the highest received wave intensity among the video terminals providing the reports as the video terminal selected by said video terminal selecting means of the audio terminal having responded to said call signal, performs control to allow communications between said video terminal and the intercom having issued said call signal, and causes the video terminal to display the image based on the video signal provided from the intercom slave having issued said call signal.

7. An intercom system with an imaging function comprising:
   an intercom slave having imaging means, audio input means, audio output means and calling means for issuing a call signal;
   a home gateway device controlling communications connection between devices capable of wired or wireless communications over a local area network;
   an intercom adapter connected to said intercom slave, and having signal converting means for converting an analog signal provided from said intercom slave into a digital signal transmittable to said local area network side, and converting a signal transmitted from said local area network side into a signal receivable by said intercom slave;
   an audio terminal being capable of transmission and reception with respect to said home gateway device, and having call responding means for responding to a call signal provided from said intercom slave, and means for audio communications with said intercom slave; and
   a video terminal capable of transmission and reception with respect to said home gateway device, and having image display means for receiving a video signal from said intercom slave, and displaying an image based on the received video signal, wherein
   said audio terminal has video terminal selecting means for selecting or deselecting said video terminal,
   said home gateway device has terminal registering means for registering the audio terminal and the video terminal capable of communications with said intercom slave,
   when said intercom slave issues the call signal, said home gateway device transmits the call signal to the audio terminal registered in said terminal registering means, and transmits the video signal provided from the intercom slave having issued said call signal to the video terminal registered in said terminal registering means, and
   when one of said audio terminals receiving said call signal responds to said call signal, said home gateway device stops transmission of said call signal and transmission of the video signal provided from the intercom slave having issued said call signal to the video terminal registered in said terminal registering means, performs control to allow bidirectional communications between the audio terminal having responded to said call signal and the intercom slave having issued said call signal, performs control to allow communications between the video terminal selected by said video terminal selecting means of said audio terminal having responded to said call signal and the intercom slave having issued said call signal, and causes the video terminal selected by said audio terminal to display the image based on the video signal provided from the intercom slave having issued said call signal, wherein said home gateway device has said terminal registering means, when said intercom slave issues the call signal, said home gateway device transmits said call signal to the audio terminal registered in said terminal registering means, and transmits the video signal provided from the intercom slave having issued said call signal to the video terminal registered in said terminal registering means, and when one of the audio terminals receiving said call signal responds to said call signal, said home gateway device stops transmission of said call signal and transmission of the video signal provided from the intercom slave having issued said call signal to the video terminal registered in said terminal registering means, performs control to allow bidirectional communications between the audio terminal having responded to said call signal and the intercom slave having issued said call signal, performs control to allow communications between the video terminal selected by said video terminal selecting means of the audio terminal having responded to said call signal and the intercom slave having issued said call signal, and causes the video terminal selected by said audio terminal to display the image based on the video signal provided from the intercom slave having issued said call signal, wherein the video terminal registered in said terminal registering means and being capable of receiving a radio wave further includes:

received wave intensity determining means for determining a reception intensity of each of the video terminals receiving the radio wave emitted from the audio terminal having responded to said call signal, and received wave intensity reporting means for reporting the received wave intensity determined by said received wave intensity determining means to said home gateway device; and when one of said audio terminals responds to the call signal provided from said intercom slave, said home gateway device requests each of the video terminals including said received wave intensity reporting means to provide a report about the received wave intensity determined by said received wave intensity determining means, and said home gateway device handles the video terminal exhibiting the highest received wave intensity among the video terminals providing the reports as the video terminal selected by said video terminal selecting means of the audio terminal having responded to said call signal, performs control to allow communications between said video terminal and the intercom having issued said call signal, and causes the video terminal to display the image based on the video signal provided from the intercom slave having issued said call signal.

8. An intercom system with an imaging function comprising:

an intercom slave having imaging means, audio input means, audio output means and calling means for issuing a call signal;

a home gateway device controlling communications connection between devices capable of wired or wireless communications over a local area network;

an intercom adapter connected to said intercom slave, and having signal converting means for converting an analog signal provided from said intercom slave into a digital signal transmittable to said local area network side, and converting a signal transmitted from said local area network side into a signal receivable by said intercom slave;

an audio terminal being capable of transmission and reception with respect to said home gateway device, and having call responding means for responding to a call signal provided from said intercom slave, and means for audio communications with said intercom slave; and a video terminal capable of transmission and reception with respect to said home gateway device, and having image display means for receiving a video signal from said intercom slave, and displaying an image based on the received video signal, wherein said audio terminal has video terminal selecting means for selecting or deselecting said video terminal, said home gateway device has terminal registering means for registering the audio terminal and the video terminal capable of communications with said intercom slave, when said intercom slave issues the call signal, said home gateway device transmits the call signal to the audio terminal registered in said terminal registering means, and transmits the video signal provided from the intercom slave having issued said call signal to the video terminal registered in said terminal registering means, and when one of said audio terminals receiving said call signal responds to said call signal, said home gateway device stops transmission of said call signal and transmission of the video signal provided from the intercom slave having issued said call signal to the video terminal registered in said terminal registering means, performs control to allow bidirectional communications between the audio terminal having responded to said call signal and the intercom slave having issued said call signal, performs control to allow communications between the video terminal selected by said video terminal selecting means of said audio terminal having responded to said call signal and the intercom slave having issued said call signal, and causes the video terminal selected by said audio terminal to display the image based on the video signal provided from the intercom slave having issued said call signal, wherein said intercom adapter is connected to said intercom slave, and comprises said signal converting means, wherein the video terminal registered in said terminal registering means and being capable of receiving a radio wave further includes:

received wave intensity determining means for determining a reception intensity of each of the video terminals receiving the radio wave emitted from the audio terminal having responded to said call signal, and received wave intensity reporting means for reporting the received wave intensity determined by said received wave intensity determining means to said home gateway device; and when one of said audio terminals responds to the call signal provided from said intercom slave, said home gateway device requests each of the video terminals including said received wave intensity reporting means to provide a report about the received wave intensity determined by said received wave intensity determining means, and said home gateway device handles the video terminal exhibiting the highest received wave intensity among the video terminals providing the reports as the video terminal selected by said video terminal selecting means of the audio terminal having responded to said call signal, performs control to allow communications between said video terminal and the intercom having issued said call signal, and causes the video terminal to display the image based on the video signal provided from the intercom slave having issued said call signal.

* * * * *